(12) United States Patent
Yamasaki et al.

(10) Patent No.: US 8,195,816 B2
(45) Date of Patent: Jun. 5, 2012

(54) SECURITY MANAGEMENT DEVICE, COMMUNICATION SYSTEM, AND ACCESS CONTROL METHOD

(75) Inventors: Yuji Yamasaki, Pasadena, CA (US); Samuel Pu, Taipei (TW); Pender Chang, Taipei (TW); Andrew Lee, San Jose, CA (US); Descartes Chen, Taipei (TW); Jill Yang, Taipei (TW); Charles Yu, Taipei (TW); Vincent Chen, Taipei (TW); Jayce Chang, Hsinchu (TW)

(73) Assignee: Trend Micro Incorporated, Tokyo (JP)

( * ) Notice: Subject to any disclaimer, the term of this patent is extended or adjusted under 35 U.S.C. 154(b) by 324 days.

(21) Appl. No.: 11/992,523

(22) PCT Filed: Sep. 28, 2006

(86) PCT No.: PCT/JP2006/319925
§ 371 (c)(1),
(2), (4) Date: Jun. 12, 2008

(87) PCT Pub. No.: WO2007/037524
PCT Pub. Date: Apr. 5, 2007

(65) Prior Publication Data
US 2009/0089426 A1    Apr. 2, 2009

(30) Foreign Application Priority Data

Sep. 30, 2005  (JP) .................................. 2005-289000
Sep. 11, 2006  (JP) .................................. 2006-245710

(51) Int. Cl.
*G06F 15/16*    (2006.01)
(52) U.S. Cl. .......... 709/229; 709/200; 709/206; 709/225
(58) Field of Classification Search .................. 709/229, 709/200, 225
See application file for complete search history.

(56) References Cited

U.S. PATENT DOCUMENTS

| 6,292,833 | B1 | 9/2001 | Liao et al. |
| 6,321,267 | B1 * | 11/2001 | Donaldson .................... 709/229 |
| 6,332,158 | B1 * | 12/2001 | Risley et al. .................. 709/219 |
| 7,689,652 | B2 * | 3/2010 | Mishra et al. ................. 709/206 |

(Continued)

FOREIGN PATENT DOCUMENTS

CN         1246773 A       8/2000
(Continued)

OTHER PUBLICATIONS

Chinese Office Action dated Nov. 10, 2010 for Chinese Application No. 200680036139.5 (with translation).

(Continued)

*Primary Examiner* — Jeffrey Pwu
*Assistant Examiner* — Farhad Ali
(74) *Attorney, Agent, or Firm* — Oliff & Berridge, PLC

(57) ABSTRACT

The present invention provides a technique of preventing a user from being tricked into revealing personal information by pharming.
Security server 50 checks whether a combination of a domain name and an IP address of WWW site 30 to be accessed by PC 10 is registered in access-permit DB 55a or access-inhibit DB 55b. Security sever 50 also checks whether the combination is registered in any of secure DNS servers 40 registered in secure DNS DB 55c. On the basis of a result of the checks, security server 50 controls an access by PC 10 to WWW site 30.

20 Claims, 12 Drawing Sheets

U.S. PATENT DOCUMENTS

2004/0103321 A1* 5/2004 Wesinger et al. ............. 713/201
2004/0123157 A1 6/2004 Alagna et al.

FOREIGN PATENT DOCUMENTS

| JP | A-2001-282797 | 10/2001 |
| JP | A-2002-024110 | 1/2002 |
| JP | A-2002-073548 | 3/2002 |
| JP | B2-3605343 | 10/2004 |
| WO | WO 01/38999 A1 | 5/2001 |
| WO | WO 01/71554 A2 | 9/2001 |
| WO | WO 2006/090392 A2 | 8/2006 |

OTHER PUBLICATIONS eazyfox, Not scammed!? Anti-phishing/pharming tool, I/O vol. 30, issue 9, Japan, Kohgaku-Sha Co., Ltd., Sep. 1, 2005, vol. 30, issue 9, pp. 129-131.

tokix, Distribute videos using Google Video uploader! New-generation video format better than DivX. Can't stop if you know!! Addictive techniques for net addicts, NetRunner vol. 7, issue 6, Japan, Softbank Publishing Inc., Jun. 1, 2005, vol. 7, issue 6, pp. 18-19.

Japanese Office Action dated Dec. 20, 2011 in Japanese Patent Application 2006-245710 (with translation).

* cited by examiner

FIG. 3A

55a: ACCESS-PERMIT DB

| DOMAIN NAME | IP ADDRESS |
|---|---|
| aaa.co.jp | 42.389.21.336 |
| bbb.co.jp | 216.232.316.11 |
| ccc.co.ne | 207.31.85.59 |
| ⋮ | ⋮ |

FIG. 3B

55b: ACCESS-INHIBIT DB

| DOMAIN NAME | IP ADDRESS |
|---|---|
| ddd.co.jp | 69.56.253.18 |
| eee.co.jp | 216.69.190.192 |
| fff.co.jp | 140.121.145.113 |
| ⋮ | ⋮ |

FIG. 3C

55c: SECURE DNS DB

| IP ADDRESS |
|---|
| 84.53.143.143 |
| 216.109.118.77 |
| 340.78.452.99 |
| ⋮ |

SECURITY MANAGEMENT DEVICE, COMMUNICATION SYSTEM, AND ACCESS CONTROL METHOD

TECHNICAL FIELD

The present invention relates to network security.

BACKGROUND ART

Japanese patent publication No. 3605343 proposes an access control system in which proxy server 1 having first database 8 and second database 9 controls access by client computer 5 to a site. First database 8 stores URLs of sites to which access is permitted, and second database 9 stores URLs of sites to which access is inhibited.

Specifically, proxy server 1 receives from client computer 5 a URL of a site to be accessed, and checks which of the databases the URL is registered in. As a result of the check, if the URL is registered in first database 8, proxy server 1 permits access by client computer 5 to the site, and if it is registered in second database 9, inhibits access to the site.

Similarly, unexamined Japanese patent publication No. 2002-73548 proposes an access control system in which router 10 storing URLs of harmful sites and URLs of harmless sites controls access by a terminal device to a site. Alternatively, unexamined Japanese patent publication No. 2002-24110 proposes an access control system where HUB 100 having an access-inhibit URL list controls access by PC 200 to a site.

DISCLOSURE OF THE INVENTION

In recent years, there has been an increase in the number of victims of phishing. Also, although the number is small compared with incidents of phishing, there are some reports of pharming.

Phishing is an online fraud that deceives a user, by use of bogus email messages and bogus websites disguised as authentic, into revealing personal information such as a password, an account number, or a credit card number.

Typically, phishing starts with a bogus email disguised as an authentic email from a bank, a credit card company, or as a link to an Internet shopping site, being sent to a terminal of a user. The bogus email contains: a message claiming, for example, that data of a customer database is being updated, and prompting the user to enter a password, an account number, or a credit card number; and a link (URL) to a site. The URL is actually a link not to an authentic site, but to a bogus site that appears authentic, and if the user clicks the link, the terminal of the user is connected to the bogus site. On the bogus site, any information entered by the user, such as a password, an account number, or a credit card number, is stolen.

A source address of a bogus email is usually fabricated, and a URL of a bogus site usually appears genuine, to keep the user from noticing that the URL is linked to a bogus site. Also, on a bogus site, an address bar of the browser is hidden, or a URL displayed on the address bar is disguised to appear authentic. Therefore, it is difficult for a user to notice that s/he is a victim of phishing.

Pharming is different from phishing in that a bogus email is not used, but the techniques are similar in that both trick a user into revealing personal information on a bogus site. Pharming is more sophisticated than phishing.

In pharming, instead of a bogus email, a computer virus (worm) or spyware is used to falsify a hosts file stored in a terminal of a user, or for DNS cache poisoning or DNS spoofing. In a hosts file and a DNS server, domain names and IP addresses are registered in association with each other for name resolution. In pharming, an IP address registered in a hosts file or a DNS server in association with a domain name is replaced with an IP address of a bogus site. Consequently, even if a user enters a URL of an authentic site, the URL is translated into an IP address of a bogus site, and therefore the user is directed to the bogus site.

In pharming, unlike in the case of phishing, a bogus email is not sent to a user. Therefore, a user cannot become aware on the basis of a bogus email that s/he is a victim of pharming. Also, in a case of pharming, an effective preventive measure against phishing, namely, that a user enters a valid URL into an address bar directly, does not work, because the URL is replaced with that of a bogus site automatically. Further, as in the case of phishing, an address bar of a browser is hidden, or a URL displayed in the address bar is disguised. Therefore, it is more difficult for a user to notice that s/he is a victim in the case of pharming than in the case of phishing. The number of victims of pharming is expected to increase in the future.

As described above, in a case of phishing, since a URL contained in a bogus email is not a URL of an authentic site, if the URL is registered in an access-inhibit database, an access to a bogus site can be prevented. Namely, the techniques proposed in the above patent publications are effective against phishing. However, in a case of pharming, since a user enters a URL of an authentic site, if only a URL is monitored, an access to a bogus site cannot be prevented. Namely, the techniques proposed by the above patent publications are not effective against pharming.

The present invention has been made in view of the problem discussed above, and provides a technique of preventing a user from becoming a victim of pharming.

To address the problem, the present invention provides a security management device comprising: a first database that stores domain names and IP addresses of sites, an access to which is confirmed as permissible, in association with each other; a second database that stores domain names and IP addresses of sites, an access to which is confirmed as not permissible, in association with each other; a communication interface configured to receive from a communication terminal a domain name and an IP address of a site; and a processor configured to: check whether a combination of the domain name and the IP address is registered in either the first database or the second database; if the combination is registered in the first database, permit an access by the communication terminal to the site; and if the combination is registered in the second database, inhibit an access by the communication terminal to the site.

The present invention also provides a security management device comprising: a first database that stores domain names and IP addresses of sites, an access to which is confirmed as permissible, in association with each other; a second database that stores identification information of at least one DNS server meeting predetermined security standards; a communication interface configured to receive from a communication terminal a domain name and an IP address of a site; and a processor configured to: check whether a combination of the domain name and the IP address is registered in the first database; if the combination is not registered in the first database, check whether the combination is registered in a DNS server whose identification information is registered in the second database; and if the combination is registered in the first database or in a DNS server, permit an access by the communication terminal to the site.

The present invention also provides a security management device comprising: a first database that stores domain names and IP addresses of sites, an access to which is confirmed as not permissible, in association with each other; a second database that stores identification information of at least one DNS server meeting predetermined security standards; a communication interface configured to receive from a communication terminal a domain name and an IP address of a site; and a processor configured to: check whether a combination of the domain name and the IP address is registered in the first database; if the combination is not registered in the first database, check whether the combination is registered in a DNS server whose identification information is registered in the second database; and if the combination is registered in the first database or if the combination is not registered in a DNS server, inhibit an access by the communication terminal to the site.

The present invention also provides a communication system comprising a communication terminal and a security management device, the communication terminal comprising: a processor configured to obtain a domain name and an IP address of a site; and a communication interface configured to send the domain name and the IP address to the security management device, the security management device comprising: a first database that stores domain names and IP addresses of sites, an access to which is confirmed as permissible, in association with each other; a second database that stores domain names and IP addresses of sites, an access to which is confirmed as not permissible, in association with each other; a communication interface configured to receive from the communication terminal the domain name and the IP address of the site; and a processor configured to: check whether a combination of the domain name and the IP address is registered in either the first database or the second database; if the combination is registered in the first database, permit an access by the communication terminal to the site; and if the combination is registered in the second database, inhibit an access by the communication terminal to the site.

The present invention also provides a communication system comprising a communication terminal and a security management device, the communication terminal comprising: a processor configured to obtain a domain name and an IP address of a site; and a communication interface configured to send the domain name and the IP address to the security management device, the security management device comprising: a first database that stores domain names and IP addresses of sites, an access to which is confirmed as permissible, in association with each other; a second database that stores identification information of at least one DNS server meeting predetermined security standards; a communication interface configured to receive from the communication terminal the domain name and the IP address of the site; and a processor configured to: check whether a combination of the domain name and the IP address is registered in the first database; if the combination is not registered in the first database, check whether the combination is registered in a DNS server whose identification information is registered in the second database; and if the combination is registered in the first database or in a DNS server, permit an access by the communication terminal to the site.

The present invention also provides a communication system comprising a communication terminal and a security management device, the communication terminal comprising: a processor configured to obtain a domain name and an IP address of a site; and a communication interface configured to send the domain name and the IP address to the security management device, the security management device comprising: a first database that stores domain names and IP addresses of sites, an access to which is confirmed as not permissible, in association with each other; a second database that stores identification information of at least one DNS server meeting predetermined security standards; a communication interface configured to receive from the communication terminal the domain name and the IP address of the site; and a processor configured to: check whether a combination of the domain name and the IP address is registered in either the first database or the second database; if the combination is not registered in the first database, check whether the combination is registered in a DNS server whose identification information is registered in the second database; and if the combination is registered in the first database or if the combination is not registered in a DNS server, inhibit an access by the communication terminal to the site.

The present invention also provides an access control method comprising: sending a domain name and an IP address of a site from a communication terminal to a security management device; receiving the domain name and the IP address at the security management device; checking at the security management device whether a combination of the domain name and the IP address is registered in either a first database or a second database, wherein the first database stores domain names and IP addresses of sites, an access to which is confirmed as permissible, in association with each other, and the second database stores domain names and IP addresses of sites, an access to which is confirmed as not permissible, in association with each other; if the combination is registered in the first database, permitting by the security management device an access by the communication terminal to the site; and if the combination is registered in the second database, inhibiting by the security management device an access by the communication terminal to the site.

The present invention also provides an access control method comprising: sending a domain name and an IP address of a site from a communication terminal to a security management device; receiving the domain name and the IP address at the security management device; checking at the security management device whether a combination of the domain name and the IP address is registered in either a first database or a second database, wherein the first database stores domain names and IP addresses of sites, an access to which is confirmed as permissible, in association with each other, and the second database stores domain names and IP addresses of sites, an access to which is confirmed as not permissible, in association with each other; if the combination is not registered in either the first database or the second database, checking at the security management device whether the combination is registered in a DNS server meeting predetermined security standards; if the combination is registered in either the first database or a DNS server, permitting by the security management device an access by the communication terminal to the site; and If the combination is registered in the second database or if the combination is not registered in a DNS server, inhibiting by the security management device an access by the communication terminal to the site.

The present invention also provides an access control method comprising: sending a domain name and an IP address of a site from a communication terminal to a security management device; receiving the domain name and the IP address at the security management device; checking at the security management device whether a combination of the domain name and the IP address is registered in a database, wherein the database stores domain names and IP addresses of sites, an access to which is confirmed as permissible, in association with each other; if the combination is not registered in the database, checking at the security management device whether the combination is registered in a DNS server meeting predetermined security standards; if the combination is registered in the database or in a DNS server, permitting by the security management device an access by the communication terminal to the site.

The present invention also provides an access control method comprising: sending a domain name and an IP address of a site from a communication terminal to a security management device; receiving the domain name and the IP address at the security management device; checking at the security management device whether a combination of the domain name and the IP address is registered in a database, wherein the database stores domain names and IP addresses of sites, an access to which is confirmed as not permissible, in association with each other; if the combination is not registered in the database, checking at the security management device whether the combination is registered in a DNS server meeting predetermined security standards; and if the combination is registered in the database or if the combination is not registered in a DNS server, inhibiting by the security management device an access by the communication terminal to the site.

According to an aspect of the present invention, a security management device checks a combination of a domain name and an IP address of a site accessed by a communication terminal to determine whether to permit access to the site. Accordingly, if an IP address registered in a host file or a DNS server in association with a domain name is changed, an access to a bogus site can be prevented. Also, a security management server checks whether a combination of a domain name and an IP address of a site accessed by a communication terminal are registered in a secure DNS server meeting predetermined security standards, and determines on the basis of a result of the check whether to permit access to the site.

The present invention also provides a security management device comprising: a memory that stores combinations of a domain name and an IP address of a bogus site camouflaging an authentic site, and IP addresses of the authentic sites in association with each other; a communication interface configured to receive from a communication terminal a domain name and an IP address of a site; and a processor configured to: check whether a combination of the domain name and the IP address is stored in the memory; and if the combination is stored in the memory, cause the communication terminal to access an authentic site identified by an IP address stored in the memory in association with the combination.

The present invention also provides a security management device comprising: a first database that stores domain names and IP addresses of sites, an access to which is confirmed as permissible, in association with each other; a second database that stores combinations of a domain name and an IP address of a bogus site camouflaging an authentic site, and IP addresses of the authentic sites in association with each other; a third database that stores identification information of at least one DNS server meeting predetermined security standards; a communication interface configured to receive from a communication terminal a domain name and an IP address of a site; and a processor configured to: check whether a combination of the domain name and the IP address is registered in either the first database or the second database; if the combination is registered in the first database, permit an access by the communication terminal to the site; if the combination is registered in the second database, cause the communication terminal to access an authentic site identified by an IP address stored in the second database in association with the combination; if the combination is not registered in either the first database or the second database, check whether the combination is registered in a DNS server whose identification information is registered in the third database; if the combination is registered in a DNS server, permit an access by the communication terminal to the site; and If the combination is not registered in a DNS server, inhibit an access by the communication terminal to the site.

The present invention also provides a communication system comprising a communication terminal and a security management device, the communication terminal comprising: a processor configured to obtain a domain name and an IP address of a site; and a communication interface configured to send the domain name and the IP address to the security management device, the security management device comprising: a memory that stores combinations of a domain name and an IP address of a bogus site camouflaging an authentic site, and IP addresses of the authentic sites in association with each other; a communication interface configured to receive from the communication terminal the domain name and the IP address of the site; and a processor configured to: check whether a combination of the domain name and the IP address is stored in the memory; and if the combination is stored in the memory, cause the communication terminal to access an authentic site identified by an IP address stored in the memory in association with the combination.

The present invention also provides a communication system comprising a communication terminal and a security management device, the communication terminal comprising: a processor configured to obtain a domain name and an IP address of a site; and a communication interface configured to send the domain name and the IP address to the security management device, the security management device comprising: a first database that stores domain names and IP addresses of sites, an access to which is confirmed as permissible, in association with each other; a second database that stores combinations of a domain name and an IP address of a bogus site camouflaging an authentic site, and IP addresses of the authentic sites in association with each other; a third database that stores identification information of at least one DNS server meeting predetermined security standards; a communication interface configured to receive from the communication terminal the domain name and the IP address of the site; and a processor configured to: check whether a combination of the domain name and the IP address is registered in either the first database or the second database; if the combination is registered in the first database, permit an access by the communication terminal to the site; if the combination is registered in the second database, cause the communication terminal to access an authentic site identified by an IP address stored in the second database in association with the combination; if the combination is not registered in either the first database or the second database, check whether the combination is registered in a DNS server whose identification information is registered in the third database; if the combination is registered in a DNS server, permit an access by the communication terminal to the site; and If the combination is not registered in a DNS server, inhibit an access by the communication terminal to the site.

The present invention also provides an access control method comprising: sending a domain name and an IP address of a site from a communication terminal to a security management device; receiving the domain name and the IP address at the security management device; checking at the security management device whether a combination of the domain name and the IP address is stored in a memory, wherein the memory stores combinations of a domain name and an IP address of a bogus site camouflaging an authentic site, and IP addresses of the authentic sites in association with each other; and if the combination is stored in the memory, causing by the security management device the communication terminal to access an authentic site identified by an IP address stored in the memory in association with the combination.

The present invention also provides an access control method comprising: sending a domain name and an IP address of a site from a communication terminal to a security management device; receiving the domain name and the IP address at the security management device; checking at the security management device whether a combination of the domain name and the IP address is registered in either a first database or a second database, wherein the first database stores domain names and IP addresses of sites, an access to which is confirmed as permissible, in association with each other, and the second database stores combinations of a domain name and an IP address of a bogus site camouflaging an authentic site, and IP addresses of the authentic sites in association with each other; if the combination is registered in the first database, permitting by the security management device an access by the communication terminal to the site; if the combination is registered in the second database, causing by the security management device the communication terminal to access an authentic site identified by an IP address stored in the second database in association with the combination; if the combination is not registered in either the first database or the second database, checking at the security management device whether the combination is registered in a DNS server whose identification information is registered in a third database, wherein the third database stores identification information of at least one DNS server meeting predetermined security standards; if the combination is registered in a DNS server, permitting by the security management device an access by the communication terminal to the site; and If the combination is not registered in a DNS server, inhibiting by the security management device an access by the communication terminal to the site.

According to an aspect of the present invention, a security management device not only checks a combination of a domain name and an IP address of a site which a communication terminal accesses to inhibit access to a bogus site, but also, if the IP address is an IP address of a bogus site, redirects a browser of the communication terminal to an authentic site.

EFFECTS OF THE INVENTION

An aspect of the present invention makes it possible to prevent a user from becoming a victim of pharming.

BRIEF DESCRIPTION OF THE DRAWINGS

An exemplary embodiment of the present invention will be described in detail based on the following figures, wherein:

FIGS. 3A, 3B, and 3C are diagrams illustrating data configurations of access-permit DB (DataBase) 55a, access-inhibit DB 55b, and secure DNS DB 55c;

BEST MODE FOR IMPLEMENTING THE INVENTION

Below, an exemplary embodiment of the present invention will be described with reference to the drawings.

A-1. Configuration of the Embodiment

Figure 1:
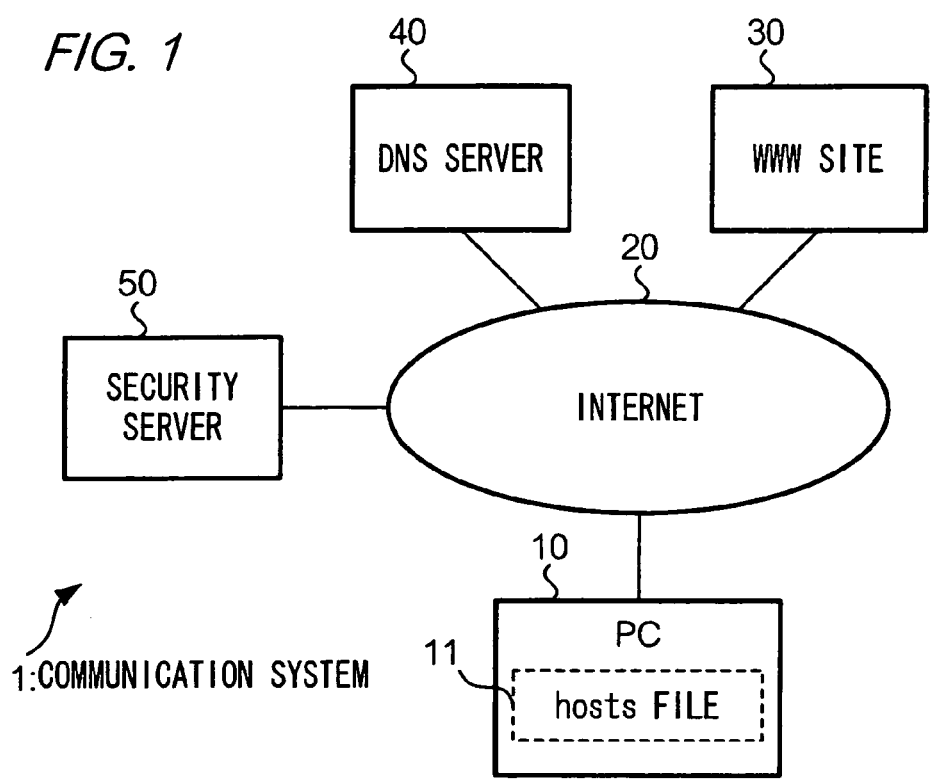
FIG. 1 is a diagram illustrating a configuration of communication system 1.

FIG. 1 is a diagram illustrating a configuration of communication system 1 according to the present embodiment. PC (Personal Computer) 10 shown in the drawing performs packet communication with WWW site 30, DNS server 40, and security server 50 using TCP/IP. PC 10 is provided with an input device such as a keyboard and a mouse, a display such as an LCD (Liquid Crystal Display), a hard disk, etc, though they are not shown in the drawing. In the hard disk, a WWW browser is installed, and if necessary, hosts file 11 is stored.

Hosts file 11 is a system file of an OS (Operating System), in which a domain name and an IP address are registered in association with each other for name resolution. For example, if a domain name "aaa.co.jp" and an IP address "42.389.21.336" are registered in association with each other in hosts file 11, the domain name "aaa.co.jp" can be converted into the IP address "42.389.21.336" in PC 10, without the necessity of sending a request for name resolution to DNS server 40.

Hosts file 11 is created as needed; therefore, the file may not be stored on the hard disk of PC 10. However, if hosts file 11 is stored on the hard disk, the file is referred to before a request for name resolution is sent to DNS server 40.

In WWW site 30, contents such as document data and image data, which are browsable by PC 10, are stored. In DNS server 40, for name resolution, a domain name and an IP address are registered in association with each other. Only one WWW site 30 and one DNS server 40 are shown in FIG. 1, for convenience of explanation; however, in reality, plurality of WWW site 30 and DNS server 40 are provided on Internet 20.

Security server 50 is a device which controls an access from PC 10 to WWW site 30.

Figure 2:
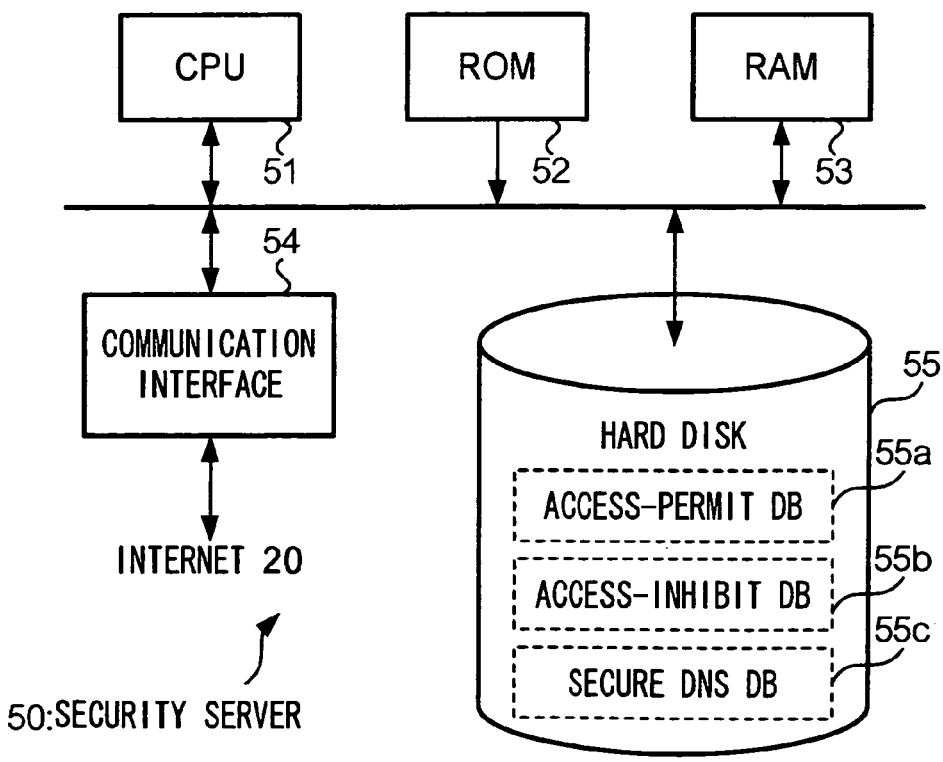
FIG. 2 is a block diagram illustrating a hardware configuration of security server 50.

FIG. 2 is a block diagram illustrating a hardware configuration of security server 50. As shown in the drawing, security server 50 is provided with: CPU 51; ROM 52; RAM 53; communication interface 54; and hard disk 55. In hard disk 55, access-permit DB 55a, access-inhibit DB 55b and secure DNS DB 55c are stored.

CPU 51 executes programs stored in ROM 52 and hard disk 55 to thereby control components of security server 50. In ROM 52, programs for basic control of components of security server 50 are stored. RAM 53 is used as a work area for CPU 51. Communication interface 54, under the control of CPU 51, controls packet communication with PC 10 or DNS server 40.

In access-permit DB 55a, a domain name, and an IP address of WWW site 30 to which an access from PC 10 is permitted, are registered in association with each other, as shown in FIG. 3A. In contrast, in access-inhibit DB 55b, a domain name, and an IP address of WWW site 30 to which an access from PC 10 is inhibited, are registered in association with each other, as shown in FIG. 3B.

Access-permit DB 55a and access-inhibit DB 55b are updated by a security management company operating security server 50. In access-permit DB 55a, a domain name, and an IP address of WWW site 30 which is confirmed by the security management company as an authentic site and to which an access is determined by the company as permissible, are registered. In contrast, in access-inhibit DB 55b, a domain name, and an IP address of WWW site 30 which is confirmed by the security management company as a bogus site for phishing or pharming, are registered.

A bogus site is, as described above, a site set up to trick a user into revealing personal information such as a password, an account number, and a credit card number. In access-inhibit DB 55b, in addition to such a bogus site for phishing or pharming, a domain name and an IP address of WWW site 30 used for other types of online swindles may be registered.

In secure DNS DB 55c, IP addresses (identification information) of DNS servers 40 meeting predetermined security standards are registered, as shown in FIG. 3C. As identification information of DNS server 40, a MAC address may be used instead of an IP address. DNS server 40 meeting predetermined security standards means, for example, DNS server 40 provided with a network security feature for preventing DNS cache poisoning or DNS spoofing. Alternatively, it means DNS server 40, not having such a network security feature in itself, but being protected by a firewall from a threat such as DNS cache poisoning or DNS spoofing. DNS server 40 meeting predetermined standards is referred to as "secure DNS server 40" in the following description.

Secure DNS DB 55c is updated by a security management company that also operates security server 50. A security management company, when new secure DNS server 40 is connected to Internet 20, registers an IP address of the DNS server 40 in secure DNS DB 55c.

A-2. Operation of the Embodiment

Figure 4:
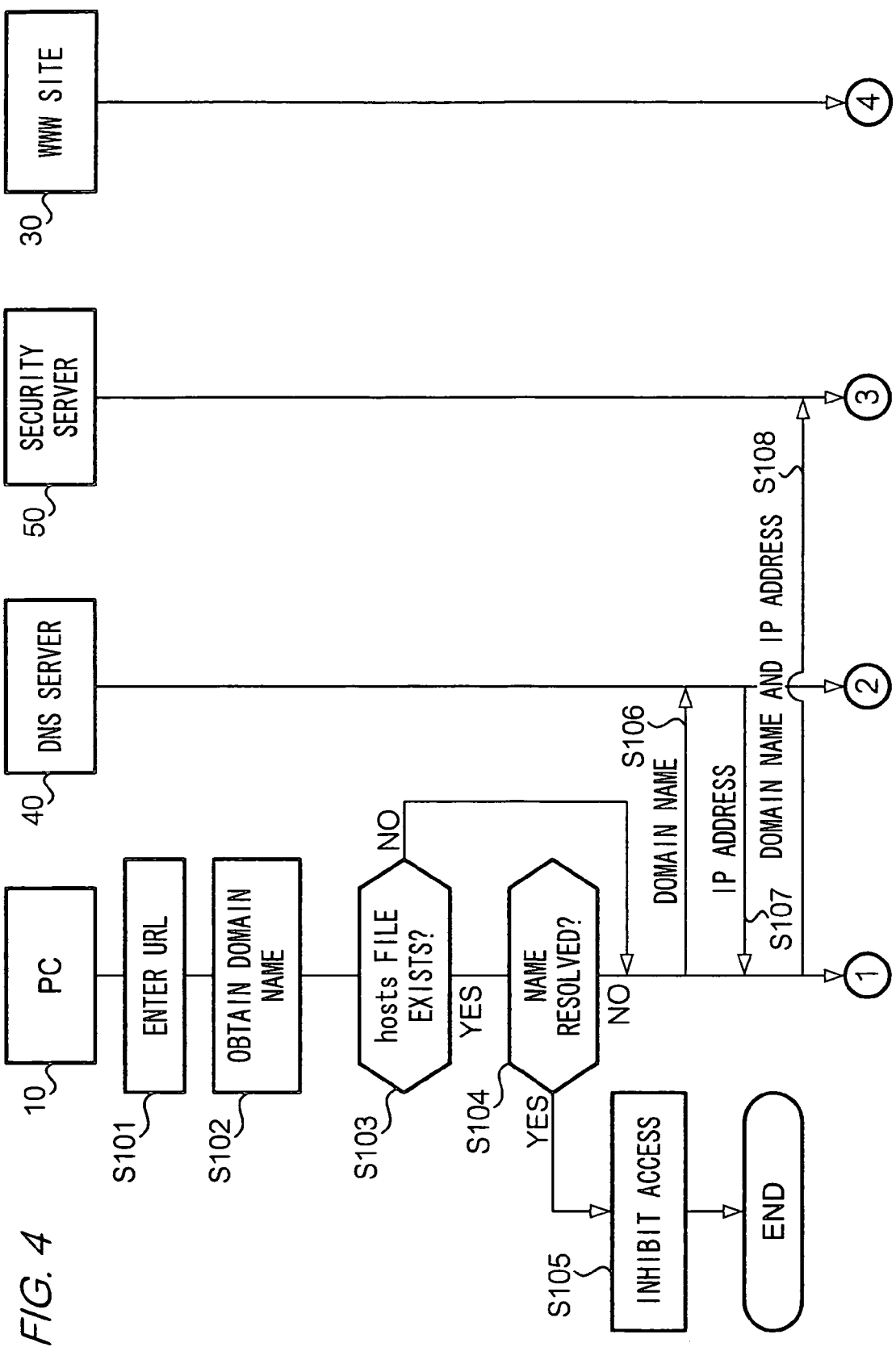
FIG. 4 is a sequence chart illustrating an access control process according to an exemplary embodiment of the present invention.
Figure 5:
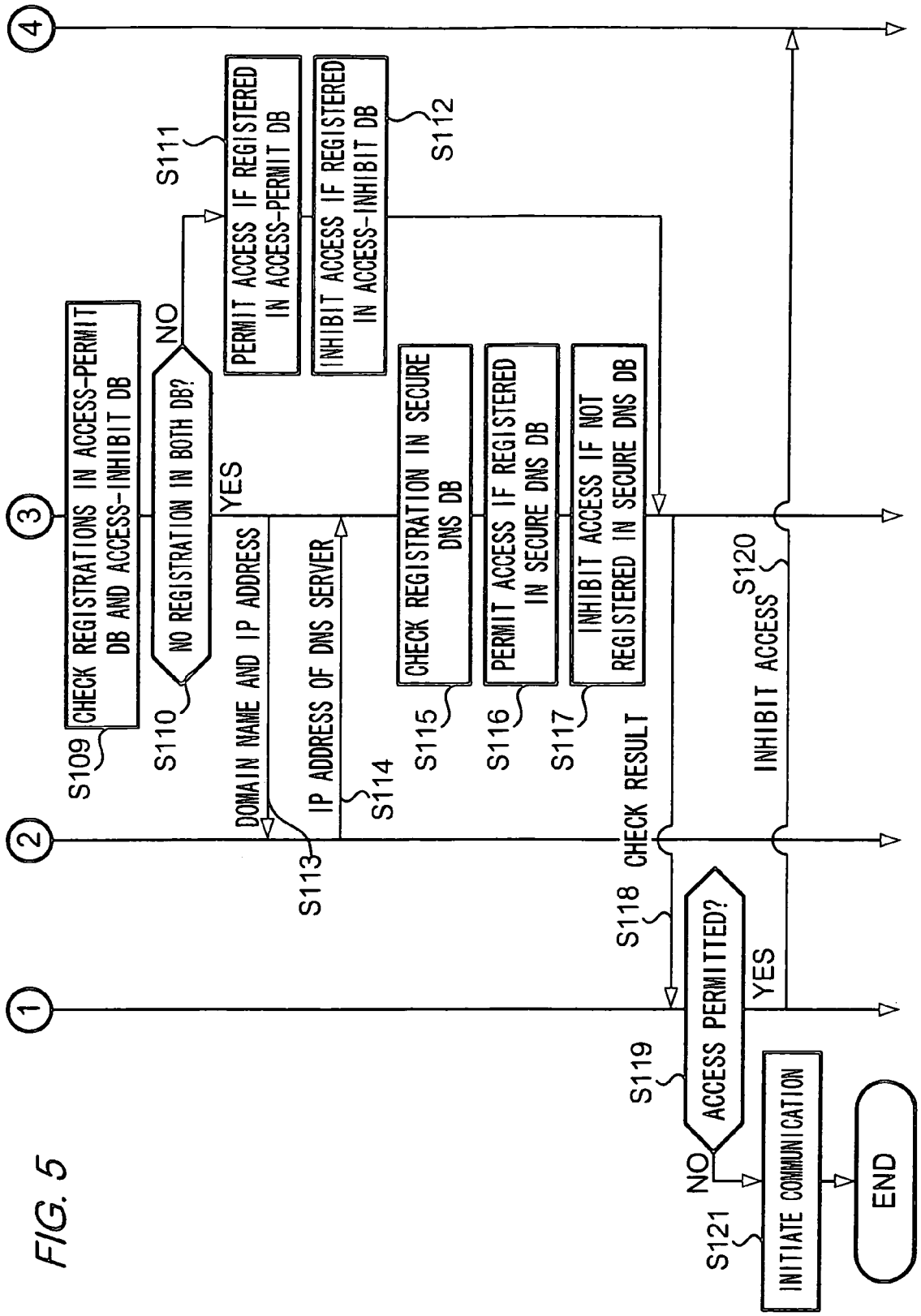
FIG. 5 is a subsequent sequence chart illustrating the access control process.

FIGS. 4 and 5 are sequence charts illustrating an access control process according to the present embodiment.

When a WWW browser is activated on PC 10 and a URL of desired WWW site 30 is entered by a user via an input device (step S101), PC 10 obtains a domain name on the basis of the entered URL (step S102). PC 10 checks whether hosts file 11 is stored (step S103), and if hosts file 11 is not stored (step S103: NO), proceeds to an operation of step S106.

On the other hand, if hosts file 11 is stored (step S103: YES), PC 10 tries to determine an IP address on the basis of hosts file 11 (step S104). If the domain name obtained at step S102 is not registered in hosts file 11, and therefore an IP address is not determined (step S104: NO), PC 10 proceeds to an operation of step S106.

On the other hand, if the domain name is registered in hosts file 11 and an IP address is determined (step S104: YES), PC 10 inhibits an access to WWW site 30 whose URL is entered at step S101 (step S105) and terminates the present access control process. At the same time, PC 10 displays on a screen a message "Hosts file 11 is suspected of having been compromised; therefore, an access to WWW site 30 has been blocked".

The reason an access to WWW site 30 is inhibited when an IP address is determined on the basis of hosts file 11 is that it is highly possible that hosts file 11 has been created for pharming by a computer virus or spyware. This is because hosts file is not normally stored in PC 10, except in rare instances where PC 10 performs communication via a VPN or where a user of PC 10 has expertise in networking and s/he creates hosts file 11 on his/her own.

Figure 6:
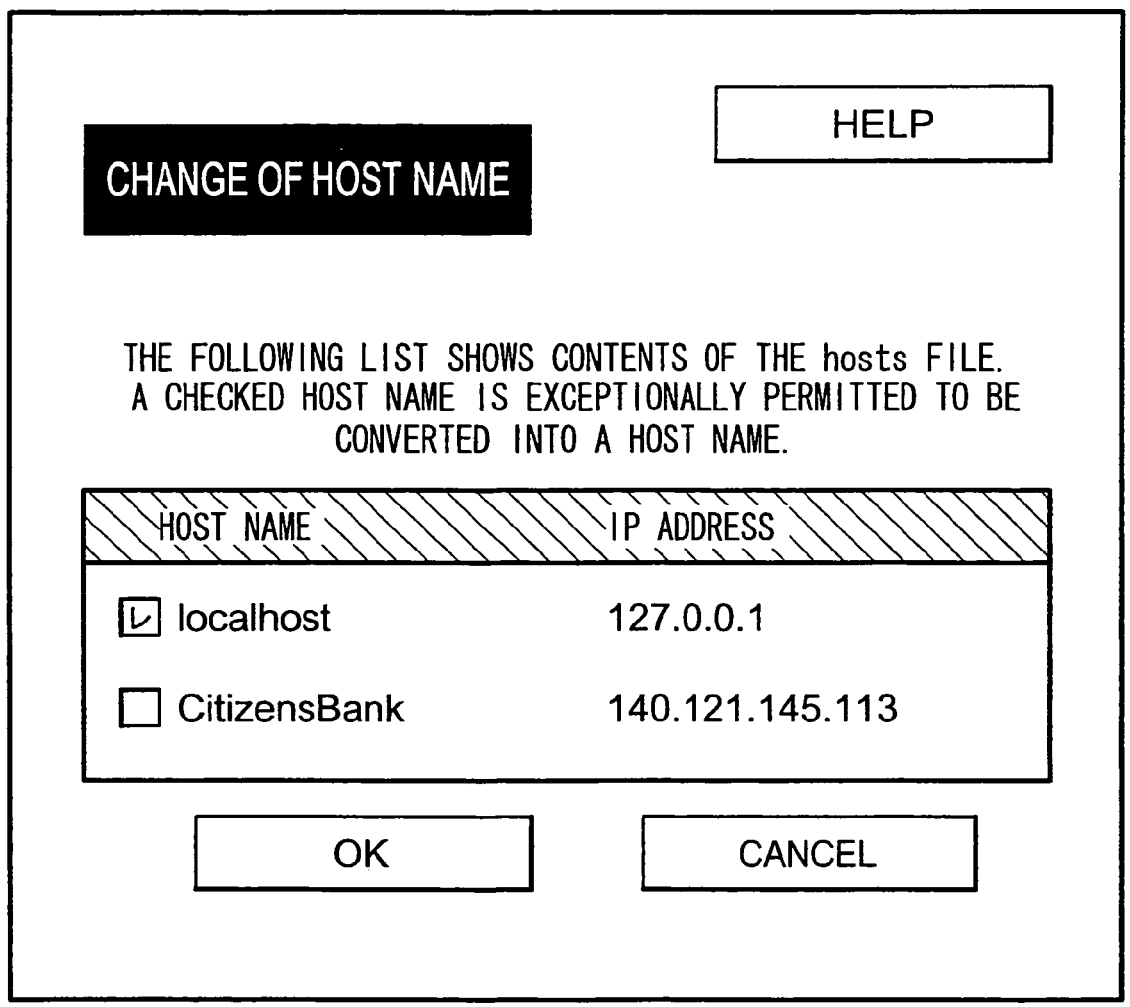
FIG. 6 is a diagram illustrating a screen displayed on PC 10 when a user of PC 10 uses an input device to specify, from among combinations of a domain name (host name) and an IP address registered in hosts file 11, a combination, an address translation of which a user permits.

However, if an access to WWW site 30 is inhibited when an IP address is determined on the basis of hosts file 11, an original advantage of hosts file 11, that an IP address can be determined without sending a request for it to DNS server 40, is lost. Therefore, if hosts file 11 exists, PC 10 may display on a screen all combinations of a domain name and an IP address registered in hosts file 11, as shown in FIG. 6, to let a user specify, via an input device, a combination of which s/he permits address translation. If the domain name obtained at step S102 is a domain name of a combination specified by a user, an access to WWW site 30 is permitted at step S105. In FIG. 6, a checked combination of a host name (domain name) "localhost" and an IP address "127.0.0.1" is a combination of which a user permits address translation.

At step S106, PC 10 sends a query to DNS server 40 for name resolution. Specifically, PC 10 sends the domain name obtained at step S102 to DNS server 40 to ask the server for name resolution (step S106). Although DNS server 40 is provided plurally as described above, DNS server 40, in which the domain name received from PC 10 is registered, replies by sending an IP address associated with the domain name to PC 10 (step S107). PC 10, when receiving the IP address from DNS server 40, sends the IP address and the domain name obtained at step S102 to security server 50 (step S108).

Security server 50, when receiving the domain name and the IP address from PC 10, checks whether the combination of the domain name and the IP address is registered in either access-permit DB 55a or access-inhibit DB 55b (step S109). If the combination is registered in neither access-permit DB 55a nor access-inhibit DB 55b (step S110: YES), security server 50 proceeds to an operation of step S13.

On the other hand, if the combination is registered in access-permit DB 55a, security server 50 determines that an access to WWW site 30 is permissible (step S111), and if the combination is registered in access-inhibit DB 55b, determines that an access to WWW site 30 is not permissible (step S112), and proceeds to an operation of step S118.

If the combination of the domain name and the IP address is registered in neither access-permit DB 55a nor access-inhibit DB 55b (step S110: YES), security server 50 communicates with DNS servers 40 to check whether the combination is registered in any of secure DNS servers 40 registered in secure DNS DB 55c.

Specifically, secure server 50 sends the domain name and the IP address to DNS servers 40 to ascertain whether the combination is registered in the DNS servers (step S113), and receives from DNS server 40 in which the combination is registered, an IP address of the DNS server (step S114). Subsequently, security server 50 checks whether the IP address is registered in secure DNS DB 55*c* (step S115).

If the IP address is registered in secure DNS DB 55*c*, namely if the combination of the domain name and the IP address is registered in secure DNS server 40, security server 50 determines that an access to WWW site 30 is permissible (step S116). On the other hand, if the IP address is not registered in secure DNS DB 55*c*, namely if the combination is not registered in secure DNS server 40, security server 50 determines that an access to WWW site 30 is not permissible (step S117). Security server 50 sends a result of the determination to PC 10 (step S118).

PC 10 controls, in accordance with the determination result received from security server 50, an access to WWW site 30 whose URL is entered at step S101. Specifically, if the determination result is that an access to WWW site 30 is permissible (step S119: YES), PC 10 initiates communication with WWW site 30 (step S120).

Figure 7:
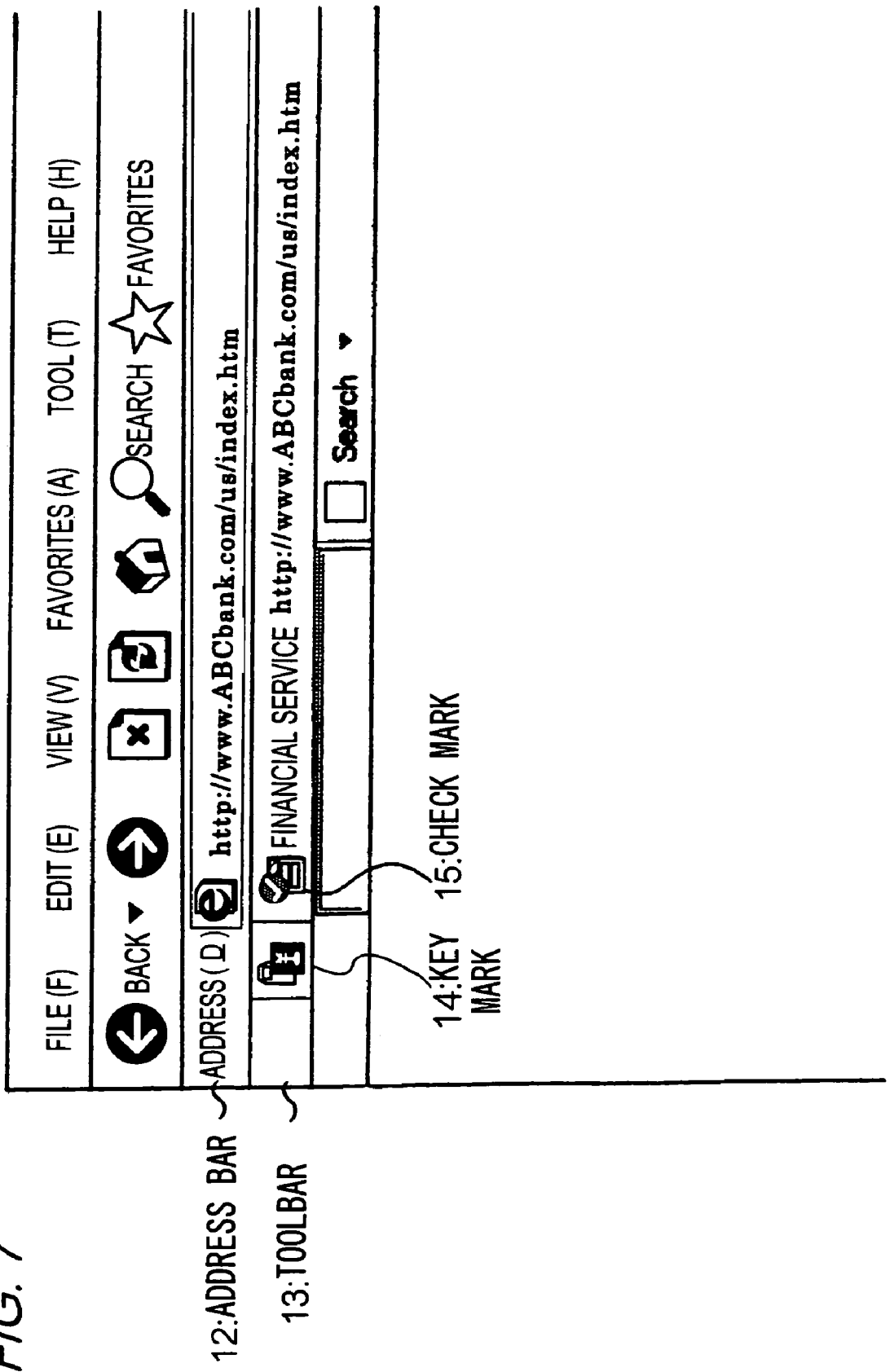
FIG. 7 is a diagram illustrating a screen displayed on PC 10 when access to WWW site 30 is permitted.

FIG. 7 is a diagram illustrating a screen displayed on PC 10 in a case where an access to WWW site 30 is permitted, and a combination of a domain name and an IP address of WWW site 30 is registered in access-permit DB 55*a*. As shown in the drawing, toolbar 13 is placed under address bar 12 in the screen. On address bar 12, an entered URL is displayed. On toolbar 13, status information on WWW site 30 being accessed is displayed, and an actual URL of WWW site 30 being accessed is also displayed. Accordingly, if address bar 12 is camouflaged by a Java (registered trademark) script with a bogus address bar, a user can easily notice that address bar 12 is camouflaged by comparing the URLs displayed on address bar 12 and toolbar 13. On toolbar 13, key mark 14, which is a mark showing that WWW site 30 being accessed has SSL, is also displayed. Accordingly, a user can easily notice that key mark 14 is camouflaged by a Java script.

In a case where the combination of the domain name and the IP address of WWW site 30 is registered in access-permit DB 55*a*, namely where WWW site 30 is confirmed by a security management company as an authentic site, green check mark 15 showing that WWW site 30 is an authentic site is displayed on toolbar 13, as shown in FIG. 7. A user can confirm from the presence of green check mark 15 that WWW site 30 being accessed is a site which is confirmed by a security management company as being authentic. When a user moves a cursor onto check mark 15 or a term "financial service", a message "This is an authentic site; therefore, you do not need to worry about phishing or pharming" is displayed.

Figure 8:
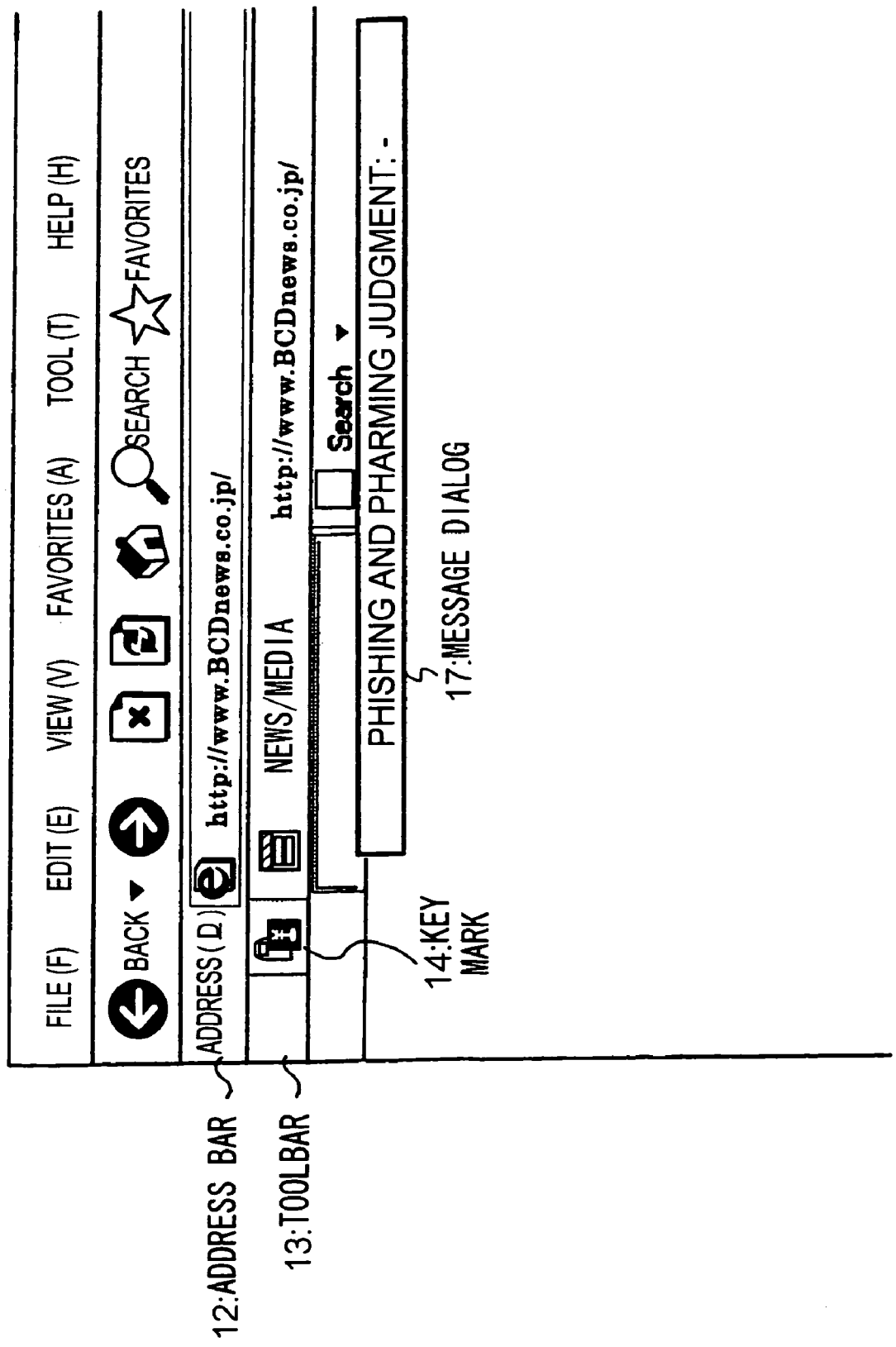
FIG. 8 is a diagram illustrating another screen displayed on PC 10 when access to WWW site 30 is permitted.

FIG. 8 is a diagram illustrating a screen displayed on PC 10 in a case where an access to WWW site 30 is permitted, and a combination of a domain name and an IP address of WWW site 30 is not registered in either access-permit DB 55*a* or access-inhibit DB 55*b*, but is registered in any of secure DNS servers 40. When a user moves a cursor onto a term "News/Media" on toolbar 13, message dialog 17 showing message "Phishing and Pharming Determination:-" is displayed under toolbar 13.

The message shows that it is highly unlikely that WWW site 30 being accessed is a bogus site used for phishing or pharming. This is because, although the combination of the domain name and the IP address of WWW site 30 is not registered in either access-permit DB 55*a* or access-inhibit DB 55*b*, namely WWW site 30 is not confirmed as being either authentic or bogus, the combination is registered in secure DNS server 40.

Figure 9:
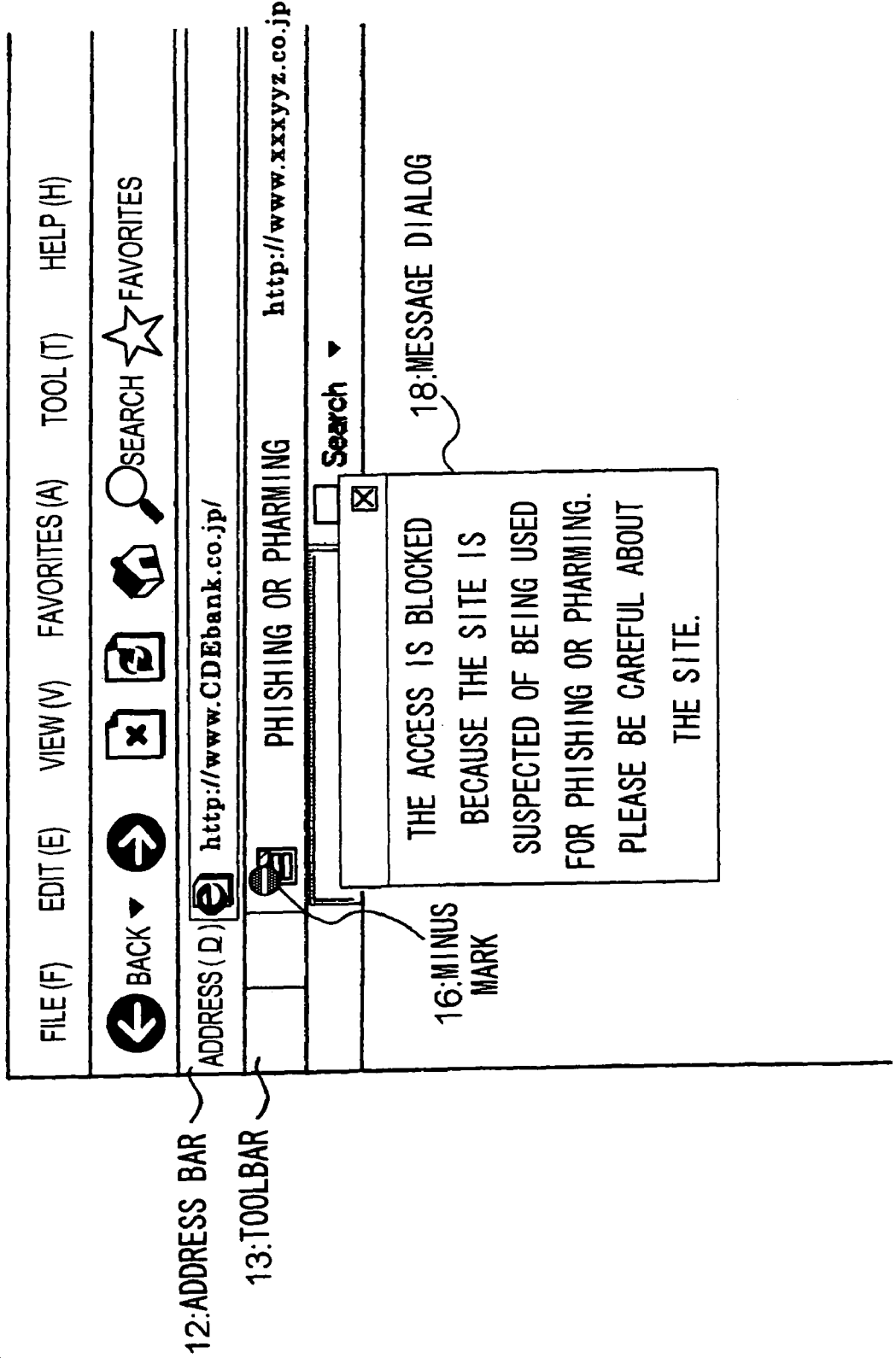
FIG. 9 is a diagram illustrating a screen displayed on PC 10 when access to WWW site 30 is inhibited.

If the determination result is that access to WWW site 30 is not permissible (step S119: NO), PC 10 inhibits access to WWW site 30 whose URL is entered at step S101 (step S121) and terminates the present access control process. FIG. 9 is a diagram illustrating a screen displayed on PC 10 when access to WWW site 30 is inhibited. In the screen, a message "Phishing or Pharming" and red minus mark 16 showing that WWW site 30 is suspected of being a bogus site is displayed on toolbar 13. Under toolbar 13, message dialog 18 showing a message "The access is blocked because the site is suspected of being used for phishing or pharming. Please be careful about the site" is displayed.

In a case of WWW site 30 whose domain name and IP address are registered in access-inhibit DB 55*b*, since the site is confirmed by a security management company as a bogus site, a message "The access is blocked because the site is for phishing or pharming" may be displayed.

In a case of WWW site 30 whose domain name and IP address are not registered in either access-permit DB 55*a*, access-inhibit DB 55*b*, or secure DNS server 40, a message "This site is not confirmed as being authentic. Please note that the site may be a bogus site for phishing or pharming" may be displayed while an access to WWW site 30 is permitted. The message can alert a user to the possibility of phishing or pharming. The message may be conveyed to a user by voice.

As described above, in the present embodiment, security server 50 checks a combination of a domain name and an IP address of WWW site 30 accessed by PC 10 to determine whether to permit access to the site. Accordingly, if an IP address registered in hosts file 11 or DNS server 40 in association with a domain name is changed, an access to a bogus site can be prevented. Consequently, a user is protected from being tricked by pharming, or phishing, into revealing personal information such as a password, an account number, or a credit card number.

Also, in the present embodiment, security server 50 checks whether a combination of a domain name and an IP address of WWW site 30 accessed by PC 10 are registered in any of secure DNS servers 40 registered in secure DNS DB 55*c*, and determines on the basis of a result of the check whether to permit access to WWW site 30. Accordingly, it can be determined whether to permit access to even a WWW site whose domain name and IP address are not registered in either access-permit DB 55*b* or access-inhibit DB 55*b*.

B. Modifications (1) In the above embodiment, security server 50 may evaluate the authenticity of WWW site 30 and send a result of the evaluation to PC 10. In this case, a URL of WWW site 30 entered on PC 10 is sent to security server 50 together with a domain name and an IP address of the site. Security server 50 grants WWW site 30 a score for each item A to I as described below, counts all the scores to calculate an overall score, and reports the overall score to PC 10. The overall score reported to PC 10 is numerical data representing a value from "0" (closer to a bogus site) to "100" (closer to an authentic site), and on the basis of the data, a message such as "Authenticity: 89 percent" is displayed on toolbar 13 of PC 10.

Item A. URL Format

A URL of some sites used for phishing or pharming takes an unusual form to prevent a user noticing at first glance that the URL is that of a bogus site. Some sites have a URL which looks like a URL of an authentic site at first glance, but redirects a browser to a bogus site. Such a URL of a bogus site is known to be likely to include a specific mark or letter. Accordingly, security server 50 analyzes a URL of WWW site 30, and if the URL falls under the following nine categories, lowers the score for WWW site 30 because it is suspected of being a bogus site.
1. URL described using quoted-printable or Base64
    e.g. aHR0cDovLzY5LjIzMS44MC4xNTI6ODUvci9pbmRleC5odG0 (equivalent to "http://69.231.80.152")
2. URL described in Unicode
    e.g. http://r7lhw6t%2ed%41%09%2E%52	%55%09 (equivalent to "http://216.69.190.192 . . . ")
3. URL in which a domain name is an IP address
    e.g. http://140.121.145.113/CitizensBank/OnlineBanking/index.html
4. URL in which a domain name is an IP address and described in decimal number
    e.g. http://3628449472/southtrustonlinebanking.com/ (equivalent to "http://216.69.190.192/southtrustonlinebanking.com/")
5. URL in which a port number is not "80"
    e.g. http://66.17.18.109:8081/aw-cgi/SignIn.html
6. URL in which a hyphen is included in a company name of a domain name
    e.g. http://customerlogin.secure-regions.com/index.php
7. URL including a space, an underline, "@", "%", or "§"
    e.g. http://65.61.34.153/68454/ebay_ss1_check/Verify-user.htm
    http://www.paypal.com@gerlynson.netfirms.com
    http%3A%2F%2F%36%36%2E%34%31%2E%32%34%31%2E%31%31%30%2F.%43%48%41%52%54%45%52%4F%4E%45% (equivalent to "http://66.41.241.110/.CHARTERONE")
8. URL not including a dot supposed to be inserted
    e.g. aHR0cDovLzY5LjIzMS44MC4xNTI6ODUvci9pbmRleC5odG0
    http://3628449472/southtrustonlinebanking.com/
9. URL redirecting a browser to another site
    e.g. http://www.funkycrackers.com/secure/socket/layer/www.ebay.com/login.asp
    http://www.wamu.com/SelectYourState.asp?TargetURL=http
10. URL using PHP
    e.g. http://202.36.65.92/secure/socket/layer/login.php Item B. Whether WWW Site 30 is Registered in Secure DNS Server 40

Security server 50 checks whether a combination of a domain name and an IP address of WWW site 30 is registered in any of secure DNS servers 40. If the combination is not registered in any of secure DNS servers 40, security server 50 lowers the score of WWW site 30 because the IP address is suspected of having been compromised by DNS cache poisoning or DNS spoofing.

Item C. Whether WWW Site 30 is Registered in Access-Permit DB 55a or Access-Inhibit DB 55b Security server 50 checks whether a combination of a domain name and an IP address of WWW site 30 is registered in either access-permit DB 55a or access-inhibit DB 55b. If the combination is registered in access-permit DB 55a, security server 50 scores full marks on WWW site 30. On the other hand, if the combination is registered in access-inhibit DB 55b, security server 50 scores "0" mark on WWW site 30.

Item D. Registration Time of Domain Name

In a case of a site used for phishing, the registration time of a domain name is likely to be of recent date. Accordingly, security server 50 communicates with a Whois server to obtain data on the registration time of a domain name of WWW site 30, and if the registration time is of recent date, lowers the score of the site because it is suspected of being a bogus site.

Item E. Entity Operating WWW Site 30

Security server 50 is provided with a database on entities operating a bogus site for phishing or pharming, and checks whether an entity operating WWW site 30 is registered in the database. If the entity operating WWW site 30 is registered in the database, security server 50 lowers the scores of the site because it is suspected of being a bogus site.

Item F. Country Code

A bogus site used for phishing or pharming is likely to be set up in a foreign country to obstruct an investigation of the fraud, or in a country in which it is relatively easy to establish a bogus site because of loose regulation. Accordingly, security server 50 determines a country in which WWW site 30 is set up on the basis of a domain name or an IP address of the site, and if the country is a foreign country or a predetermined country, lowers the scores of the site because it is suspected of being a bogus site.

Item G. Whether WWW Site 30 Has SSL

Security server 50 checks whether WWW site 30 has SSL. If the site does not have SSL, security server 50 lowers grades of the site because it is suspected of being a bogus site.

Item H. Similarity

In some bogus sites used for phishing, as a domain name, a term which looks similar at first glance to a domain name of an authentic site is used. In such a domain name, for example, a letter "l" in a domain name of an authentic site is replaced with a numeric "1 (one)", a letter "o" in a domain name of an authentic site is replaced with a numeric "0 (zero)", or an additional space or hyphen is included. Accordingly, security server 50 is provided with a database of domain names of authentic sites, and checks whether a domain name similar to that of WWW site 30 is registered in the database. If such a domain name is registered in the database and the domain name of WWW site 30 has predetermined characteristics, for example, that a letter "l" in a domain name of an authentic site is replaced with a numeric "1" or that a letter "o" in a domain name an authentic site is replaced with a numeric "0", security server 50 lowers the scores of WWW site 30 because it is suspected of being a bogus site. In a case where WWW site 30 is suspected of being a bogus site, in addition to a check of a domain name, security server 50 may compare DOM trees of WWW site 30 and an authentic site to check the similarity of contents of both sites.

Item I. Camouflage of Address Bar

Security server 50 checks whether WWW site 30 is a site which causes a Java script to camouflage an address bar of PC 10 with a bogus one. If WWW site 30 is such a site, security server 50 lowers the scores of the site because it is suspected of being a bogus site.

Security server 50 counts all the scores for the above items and calculates from the scores a final overall score. Each of the items has a different weight in the final overall score. The overall score is reported to PC 10, and on the basis of the score, a message like "Authenticity: 89 percent" is displayed on toolbar 13 of PC 10.

Among the above items, if a score for Item D is full marks, namely a combination of a domain name and an IP address of WWW site 30 is registered in access-permit DB 55a, a message "Authenticity: 100 percent" may be displayed without evaluating the other items. On the other hand, if a score for Item D is "0" mark, namely a combination of a domain name and an IP address of WWW site 30 is registered in access-inhibit DB 55b, a message "Authenticity: 0 percent" may be displayed without evaluating the other items.

As described above, in the present modification, an evaluation of authenticity of WWW site 30 is displayed on PC 10. Accordingly, a user accessing WWW site 30 can obtain more detailed information about the possibility that the site is a bogus site used for phishing or pharming. Especially, the modification has an advantage in that, if a combination of a domain name and an IP address of WWW site 30 is not registered in either access-permit DB 55*a* or access-inhibit DB 55*b*, a user can decide on the basis of an evaluation of WWW site 30 whether to access the site or enter personal information such as a password, an account number, or a credit card number.

(2) In the above embodiment, access-permit DB 55*a*, access-inhibit DB 55*b*, and secure DNS DB 55*c* are provided, and in a case where a combination of a domain name and an IP address of WWW site 30 being accessed by PC 10 is not registered either access-permit DB 55*a* or access-inhibit DB 55*b*, it is checked whether the combination is registered in any of secure DNS servers 40 registered in secure DNS DB 55*c*.

However, the above embodiment may not be provided with access-inhibit DB 55*b*. In this case, security server 50 checks whether a combination of a domain name and an IP address of WWW site 30 is registered in access-permit server 55*a*, and if the combination is not registered in access-permit DB 55*a*, checks whether the combination is registered in any of secure DNS servers 40 registered in secure DNS DB 55*c*. If the combination is registered in access-permit DB 55*a*, or if the combination is not registered in access-permit DB 55*a* but registered in secure DNS server 40, an access to WWW site 30 is permitted. On the other hand, if the combination is not registered in either access-permit DB 55*a* or secure DNS server 40, an access to WWW site 30 is inhibited.

Alternatively, the above embodiment may not be provided with access-permit DB 55*a*. In this case, security server 50 checks whether a combination of a domain name and an IP address of WWW site 30 is registered in access-inhibit DB 55*b*, and if the combination is not registered in access-inhibit DB 55*b*, checks whether the combination is registered in any of secure DNS servers 40 registered in secure DNS DB 55*c*. If the combination is registered in access-inhibit DB 55*b*, or if the combination is not registered in either access-inhibit DB 55*b* or secure DNS server 40, an access to WWW site 30 is inhibited. On the other hand, if the combination is not registered in either access-inhibit DB 55*b* but registered in secure DNS server 40, an access to WWW site 30 is permitted.

(3) In the above embodiment, even in a case where an IP address is determined on the basis of hosts file 11 (step S104: YES), the IP address and a domain name obtained at step S102 may be sent to security server 50 to let the server check whether an access to WWW site 30 is permissible.

Also, in the above embodiment, the check by security server 50 may be performed while letting PC 10 access WWW site 30, and if it is determined that an access to the site is not permissible, the access to WWW site 30 by PC 10 may be interrupted.

(4) In the above embodiment, instead of Internet 20, an intranet, a mobile packet communication network, or a public wireless LAN may be used. PC 10 may be a mobile terminal such as a personal computer with a wireless LAN card or a mobile phone. Security server 50 may be a proxy server, a firewall, or an intermediary device such as a gateway server, a router, or a hub.

(5) In the above embodiment, if a combination of a domain name and an IP address of WWW site 30 received from PC 10 is registered in access-inhibit DB 55*b*, security server 50 determines that the site is a bogus site and inhibits an access by PC 10 to the site. However, in this case, if security server 50 is able to determine an authentic IP address of the desired site, the server can not only inhibit an access by PC 10 to a bogus site, but also redirect a browser of PC 10 to an authentic site. The modification will be described in detail below. In the following description, elements shared with the above embodiment are denoted by like numerals, and explanation of the elements will be omitted.

Figures 10, 11:
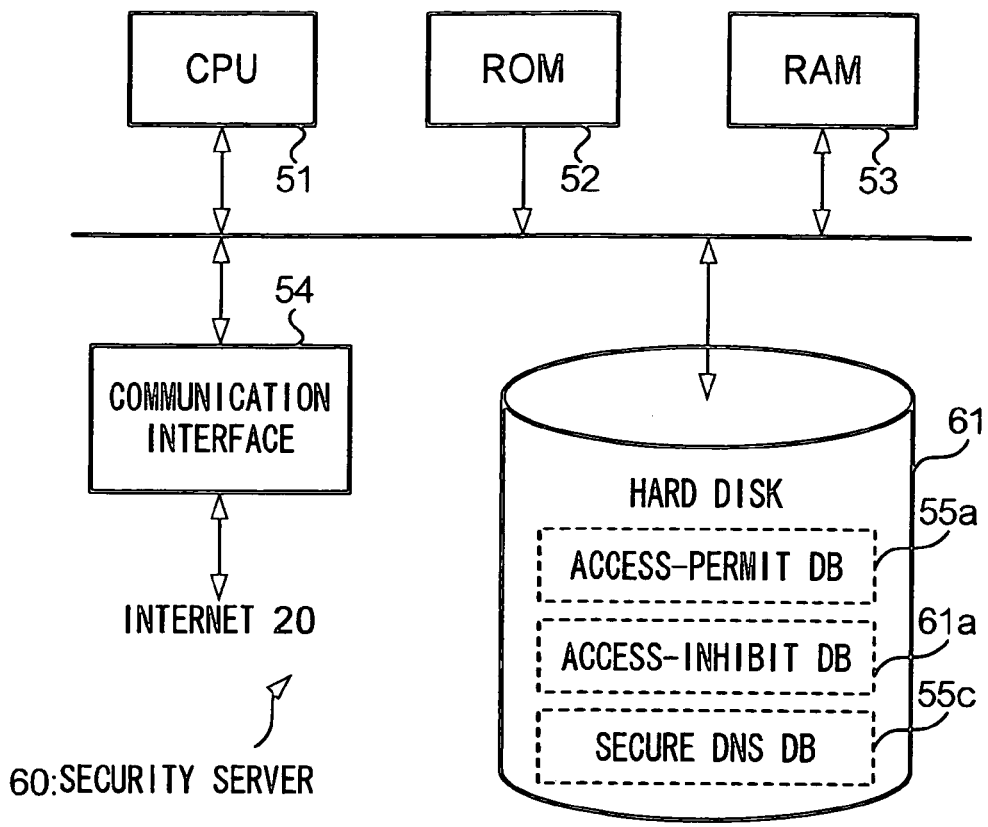
FIG. 10 is a block diagram illustrating a hardware configuration of security server 60 according to a modification (5) of the present invention.
FIG. 11 is a diagram illustrating a data configuration of access-inhibit DB 61a according to the modification (5)

FIG. 10 is a block diagram illustrating a hardware configuration of security server 60 according to the present modification. As shown in the drawing, security server 60 is different from security server 50 shown in FIG. 2 in storing access-inhibit DB 61*a* shown in FIG. 11 in hard disk 61 instead of access-inhibit DB 55*b* shown in FIG. 3B. Access-permit DB 55*a* and secure DNS DB 55*c* shown in FIG. 10 are the same as those of the above embodiment.

As shown in FIG. 11, in access-inhibit DB 61*a*, a combination of a domain name and an IP address of a bogus site, and an IP address of an authentic site are registered in association with each other. For example, in the drawing, as item No. 1, a combination of a domain name "ddd.co.jp" and an IP address "69.56.253.18" of a bogus site is registered in association with an IP address "42.389.21.336" of an authentic site. Also, as item No. 2, a first combination of a domain name "eee.co.jp" and an IP address "216.69.190.192" of a first bogus site and a second combination of a domain name "fff.co.jp" and an IP address "140.121.145.113" of a second bogus site are registered in association with an IP address "207.31.85.59" of an authentic site. Item No. 2 is an example of a case where there are two bogus sites for one authentic site.

The bogus site is, as described above, a WWW site disguised as an authentic site and used for online swindling such as phishing and pharming.

Access-inhibit DB 61*a* is updated by a security management company operating security server 60. A security management company, when finding a new bogus site, registers a combination of a domain name and an IP address of the bogus site in access-inhibit DB 61*a* in association with an IP address of an authentic site.

Figure 12:
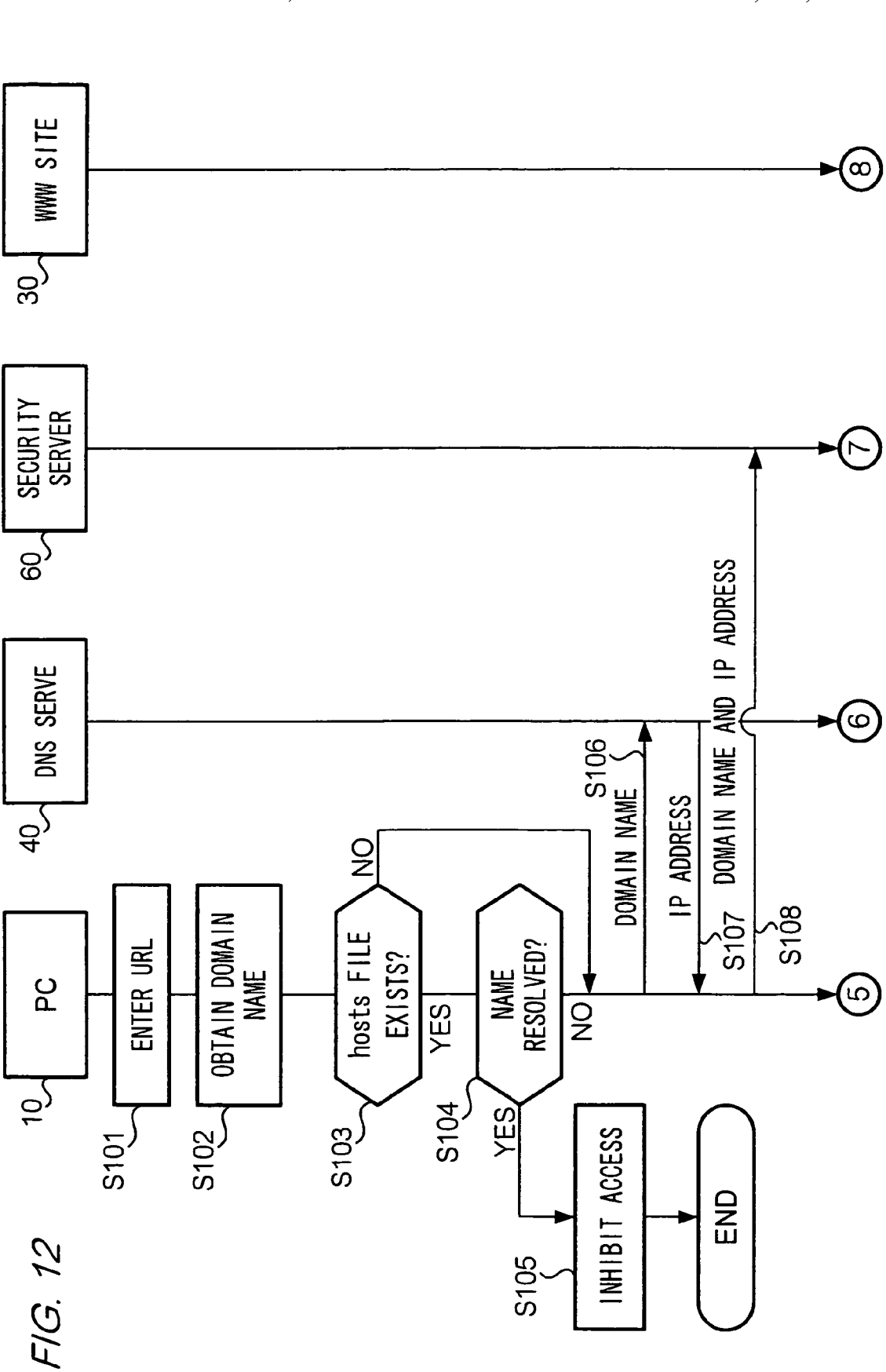
FIG. 12 is a sequence chart illustrating an access control process according to the modification (5)
Figure 13:
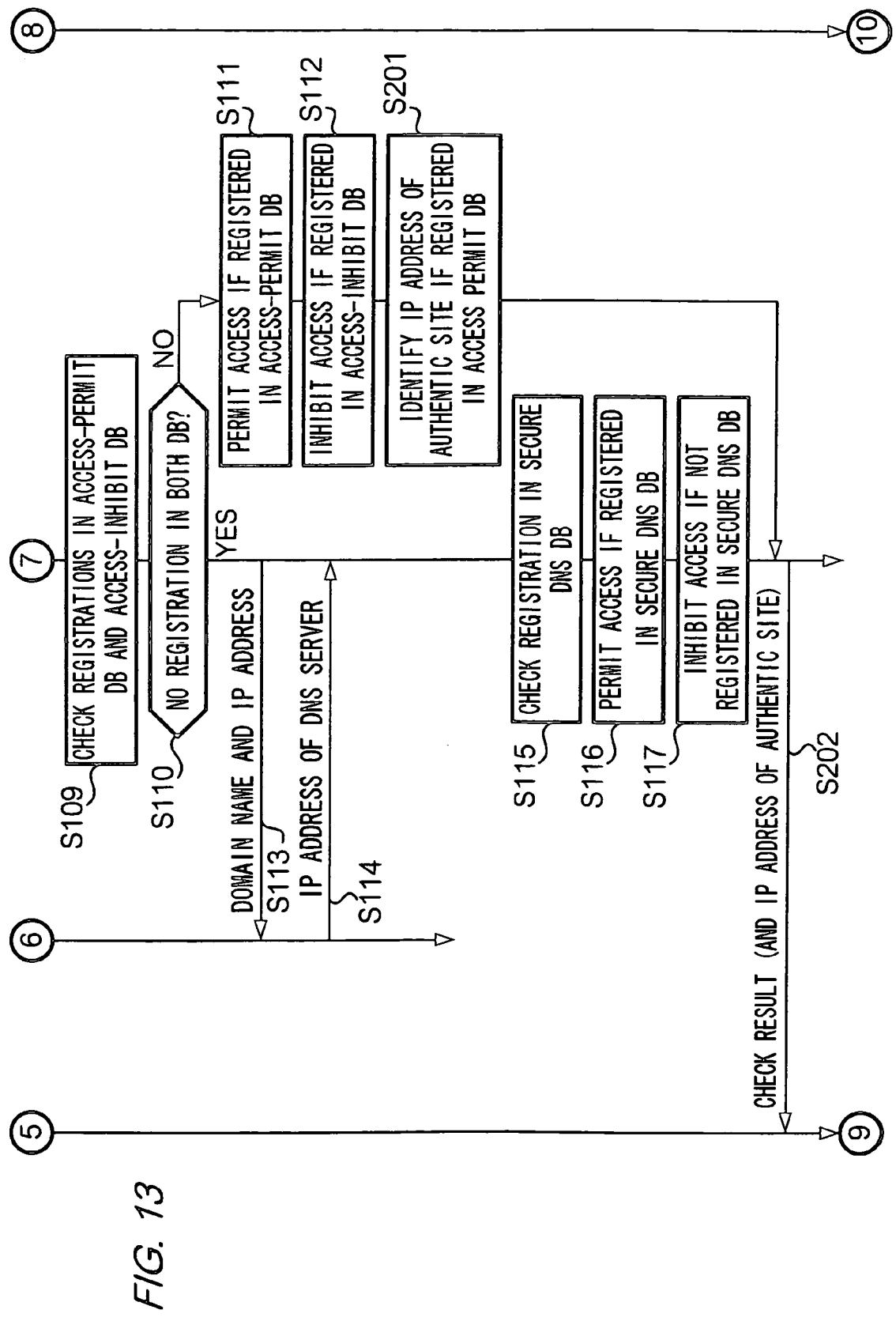
FIG. 13 is a subsequent sequence chart illustrating the access control process.
Figure 14:
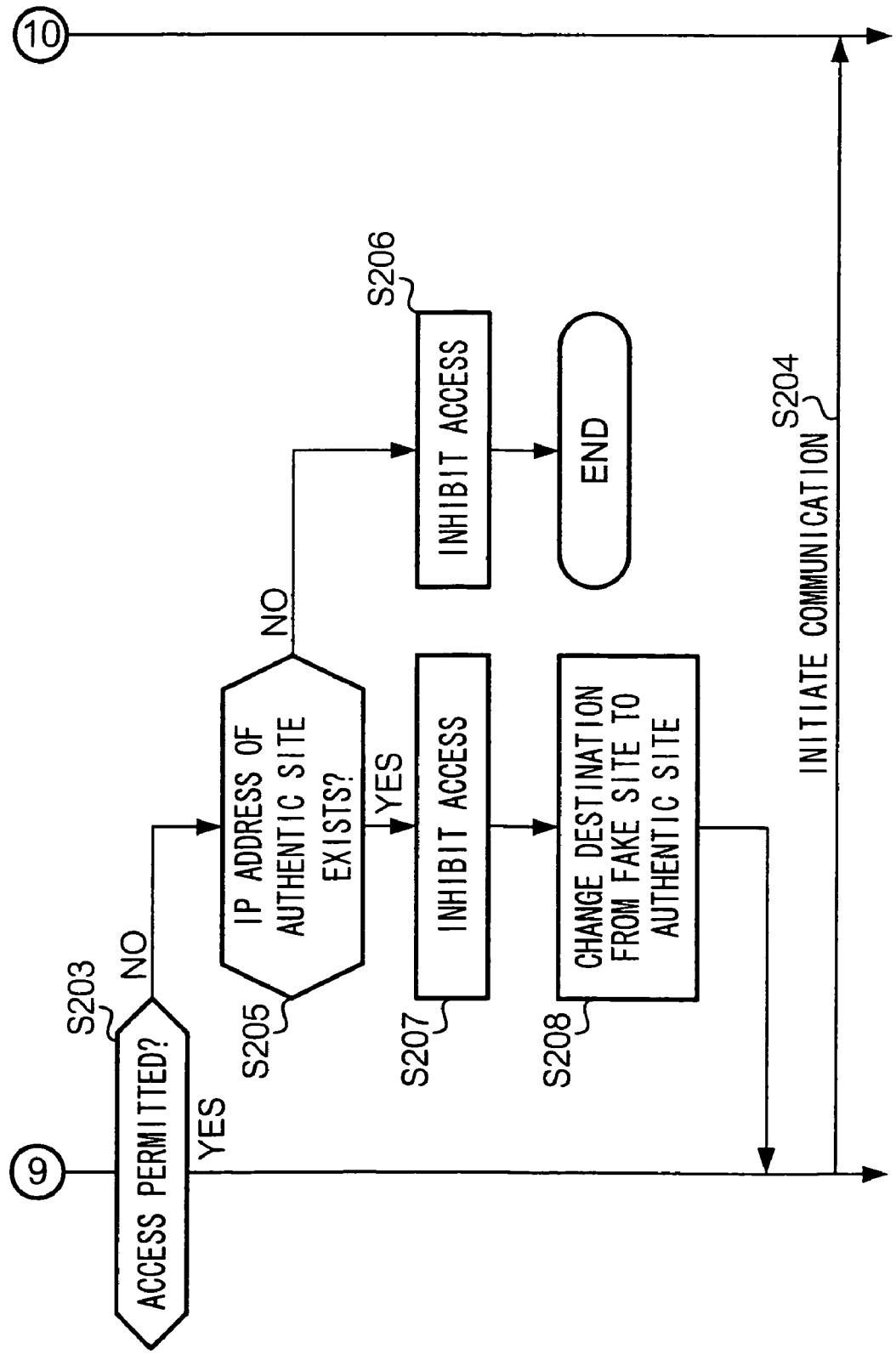
FIG. 14 is a further subsequent sequence chart illustrating the access control process.

Now, an access control process according to the present modification will be described with reference to a sequence chart shown in FIGS. 12 to 14. In the access control process, an operation performed except in a case where a combination of a domain name and an IP address is registered as those of a bogus site in access-inhibit DB 61*a* is basically the same as that of the above embodiment.

Namely, an operation of a case where security server 60 receives from PC 10 a combination of a domain name and an IP address of WWW site 30 to be accessed, and checks the combination against access-permit DB 55*a* or access-inhibit DB 55*b*; an operation of a case where a combination of a domain name and an IP address received from PC 10 is registered in access-permit DB 55*a*; or an operation of a case where a combination of a domain name and an IP address received from PC 10 is not registered in either access-permit DB 55*a* or access-inhibit DB 61*a* are the same as those of the above embodiment. Therefore, in the sequence chart shown in FIGS. 12 to 14, processes shared with the above embodiment are denoted by like step numbers, and in the following description, explanation of the processes will be simplified.

When a URL of desired WWW site 30 is entered on PC 10 (step S101), PC 10 obtains a domain name on the basis of the entered URL (step S102). PC 10 checks whether hosts file 11 is stored in itself (step S103), and if hosts file 11 is not stored (step S103: NO), proceeds to an operation of step S106. On the other hand, if hosts file 11 is stored (step S103: YES), PC 10 tries to determine an IP address on the basis of hosts file 11

(step S104). If the domain name obtained at step S102 is not registered in hosts file 11 and therefore an IP address is not determined (step S104: NO), PC 10 proceeds to an operation of step S106. On the other hand, if the domain name is registered in hosts file 11 and an IP address is determined (step S104: YES), PC 10 inhibits an access to WWW site 30 whose URL is entered at step S101 (step S105) and terminates the present access control process. At the same time, PC 10 displays on a screen a message "Hosts file 11 is suspected of having been compromised; therefore, an access to WWW site 30 has been blocked".

At step S106, PC 10 sends a query to DNS server 40 for name resolution. Specifically, PC 10 sends the domain name obtained at step S102 to DNS server 40 to ask the server for name resolution (step S106). In response to the request, DNS server 40 replies by sending an IP address associated with the domain name to PC 10 (step S107). PC 10, when receiving the IP address from DNS server 40, sends the IP address and the domain name obtained at step S102 to security server 60 (step S108).

Security server 60, when receiving the domain name and the IP address from PC 10, checks whether the combination of the domain name and the IP address is registered in either access-permit DB 55a or access-inhibit DB 61a (step S109). If the combination is not registered in both access-permit DB 55a and access-inhibit DB 61a (step S110: YES), security server 50 proceeds to an operation of step S13.

On the other hand, if the combination is registered in access-permit DB 55a, security server 60 determines that an access to WWW site 30 is permissible (step S111). Alternatively, if the combination is registered in access-inhibit DB 61a as those of a bogus site, security server 60 determines that an access to WWW site 30 is not permissible (step S112). At the same time, security server 60 identifies an IP address of an authentic site associated with the combination on access-inhibit DB 61a (step S201).

If the combination of the domain name and the IP address is not registered in both access-permit DB 55a and access-inhibit DB 61a (step S110: YES), security server 60 communicates with DNS servers 40 to check whether the combination is registered in any of secure DNS servers 40 registered in secure DNS DB 55c (steps S113 to S115). If the combination of the domain name and the IP address is registered in secure DNS server 40, security server 60 determines that an access to WWW site 30 is permissible (step S116). On the other hand, if the combination is not registered in secure DNS server 40, security server 60 determines that an access to WWW site 30 is not permissible (step S117).

Subsequently, security server 60 sends a result of the determination to PC 10 (step S202); however, if the combination of the domain name and the IP address is registered in access-inhibit DB 61a, security server 60 sends, in addition to a result of the determination informing that an access to WWW site 30 is not permissible, the IP address of the authentic site identified at step S201 to PC 10.

If the determination result received from security server 60 is that an access to WWW site 30 is permissible (step S203: YES), PC 10 initiates communication with WWW site 30 whose URL is entered at step S101 (step S204). Namely, if the combination of the domain name and the IP address of WWW site 30 is registered in access-permit DB 55a, or if the combination is not registered in either access-permit DB 55a or access-inhibit DB 61a, but registered in secure DNS server 40, PC 10 permits an access to WWW site 30.

On the other hand, if the determination result received from security server 60 is that an access is not permissible (step S203: NO), and an IP address of an authentic site is not received along with the determination result (step S205: NO), PC 10 inhibits an access to WWW site 30 whose URL is entered at step S101 (step S206). Namely, if the combination of the domain name and the IP address of WWW site 30 is not registered in either access-permit DB 55a, access-inhibit DB 61a, or secure DNS server 40, PC 10 inhibits an access to WWW site 30. At the same time, PC 10 may display a message "Please note that this site is not firmly confirmed as being authentic".

On the other hand, if the determination result received from security server 60 is that an access to WWW site 30 is not permissible (step S203: NO), and an IP address of an authentic site is received along with the determination result (step S205: YES), PC 10 not only inhibits an access to WWW site 30 whose URL is entered at step S101 (step S207), but also initiates communication with the authentic site using the received IP address (steps S204 and S208). Namely, if the combination of the domain name and the IP address of WWW site 30 is registered in access-inhibit DB 61a, PC 10 redirects its browser from a bogus site identified by the IP address to the authentic site identified by the IP address received from security server 60.

When redirecting the browser to the authentic site, PC 10 may display a message "The access is blocked because the site is a bogus site. Do you wish to start communication with an authentic site identified by an IP address "42.389.21.336"?" to a user, and in response to a command from the user, and initiate communication with the authentic site.

As described above, in the present modification, a combination of a domain name and an IP address of a bogus site, and an IP address of an authentic site are registered in access-inhibit DB 61a in association with each other. Accordingly, if a combination of a domain name and an IP address received from PC 10 is registered in access-inhibit DB 61a, security server 60 can not only prevent an access to a bogus site, but also redirect a browser of PC 10 to an authentic site.

What is claimed is:

1. A security management device comprising:
   a first database that stores domain names and IP addresses of sites, an access to which is confirmed as permissible, in association with each other;
   a second database that stores domain names and IP addresses of sites, an access to which is confirmed as not permissible, in association with each other;
   a third database that stores identification information of a plurality of DNS servers meeting predetermined security standards, the third database being protected by a network security feature for preventing DNS cache poisoning;
   a communication interface configured to receive from a communication terminal a domain name and an IP address of a site; and
   a processor configured to:
   check whether a combination of the domain name and the IP address is registered in either the first database or the second database;
   if the combination is registered in the first database, permit an access by the communication terminal to the site;
   if the combination is registered in the second database, inhibit an access by the communication terminal to the site;
   if the combination is not registered in either the first database or the second database, check whether the combination is registered in at least one of the plurality of DNS servers whose identification information is registered in the third database;

if the combination is registered in the at least one DNS server, permit an access by the communication terminal to the site; and if the combination is not registered in the at least one DNS server, inhibit an access by the communication terminal to the site.

2. The security management device according to claim 1, wherein:
the processor is further configured to evaluate authenticity of the site in accordance with predetermined rules; and
the communication interface is further configured to send the evaluation to the communication terminal.

3. The security management device according to claim 1, further comprising a fourth database that operates a security server, the security server being configured to evaluate the authenticity of a site and lower a score of the site if the site is suspected of being a bogus site based on information obtained from the fourth database, the score being used to determine whether the site is bogus.

4. The security management device according to claim 1, wherein the combination includes the domain name and the IP address associated with the domain name.

5. A security management device comprising:
a first database that stores domain names and IP addresses of sites, an access to which is confirmed as permissible, in association with each other;
a second database that stores identification information of a plurality of DNS servers meeting predetermined security standards, the second database being protected by a network security feature for preventing DNS cache poisoning;
a communication interface configured to receive from a communication terminal a domain name and an IP address of a site; and
a processor configured to:
check whether a combination of the domain name and the IP address is registered in the first database;
if the combination is not registered in the first database, check whether the combination is registered in at least one of the plurality of DNS servers whose identification information is registered in the second database; and
if the combination is registered in the first database or in a DNS in the at least one DNS server, permit an access by the communication terminal to the site.

6. The security management device according to claim 5, wherein the processor is configured to, if the combination is not registered in the at least one DNS server, inhibit an access by the communication terminal to the site.

7. A security management device comprising:
a first database that stores domain names and IP addresses of sites, an access to which is confirmed as not permissible, in association with each other;
a second database that stores identification information of a plurality of DNS servers meeting predetermined security standards, the second database being protected by a network security feature for preventing DNS cache poisoning;
a communication interface configured to receive from a communication terminal a domain name and an IP address of a site; and
a processor configured to:
check whether a combination of the domain name and the IP address is registered in the first database;
if the combination is not registered in the first database, check whether the combination is registered in at least one of the plurality of DNS servers whose identification information is registered in the second database; and
if the combination is registered in the first database or if the combination is not registered in the at least one DNS server, inhibit an access by the communication terminal to the site.

8. The security management device according to claim 7, wherein the processor is configured to:
if the combination is registered in the first database or if the combination is not registered in the at least one DNS server, inhibit an access by the communication terminal to the site; and
if the combination is registered in the at least one DNS server, permit an access by the communication terminal to the site.

9. A communication system comprising a communication terminal and a security management device,
the communication terminal comprising:
a processor configured to obtain a domain name and an IP address of a site; and
a communication interface configured to send the domain name and the IP address to the security management device,
the security management device comprising:
a first database that stores domain names and IP addresses of sites, an access to which is confirmed as permissible, in association with each other;
a second database that stores domain names and IP addresses of sites, an access to which is confirmed as not permissible, in association with each other;
a third database that stores identification information of a plurality of DNS servers meeting predetermined security standards, the third database being protected by a network security feature for preventing DNS cache poisoning;
a communication interface configured to receive from the communication terminal the domain name and the IP address of the site; and
a processor configured to:
check whether a combination of the domain name and the IP address is registered in either the first database or the second database;
if the combination is registered in the first database, permit an access by the communication terminal to the site;
if the combination is registered in the second database, inhibit an access by the communication terminal to the site;
if the combination is not registered in either the first database or the second database, check whether the combination is registered in at least one of the plurality of DNS servers whose identification information is registered in the third database;
if the combination is registered in the at least one DNS server, permit an access by the communication terminal to the site; and
if the combination is not registered in the at least one DNS server, inhibit an access by the communication terminal to the site.

10. The communication system according to claim 9, wherein:
the communication terminal further comprises a host file; and
the processor of the communication terminal is further configured to, if the combination of the domain name and the IP address is registered in the host file, inhibit an access by the communication terminal to the site.

11. The communication system according to claim 10, wherein the processor of the communication terminal is configured to, if the combination of the domain name and the IP address is registered in the host file and if the combination is not pre-confirmed by a user of the communication terminal as a combination usable for name resolution, inhibit an access by the communication terminal to the site.

12. The communication system according to claim 9, wherein:
the processor of the security management device is further configured to evaluate authenticity of the site in accordance with predetermined rules;
the communication interface of the security management device is further configured to send the evaluation to the communication terminal;
the communication interface of the communication terminal is configured to receive the evaluation; and
the communication terminal further comprises a display configured to display the evaluation on a screen.

13. A communication system comprising a communication terminal and a security management device,
the communication terminal comprising:
a processor configured to obtain a domain name and an IP address of a site; and
a communication interface configured to send the domain name and the IP address to the security management device,
the security management device comprising:
a first database that stores domain names and IP addresses of sites, an access to which is confirmed as permissible, in association with each other;
a second database that stores identification information of a plurality of DNS servers meeting predetermined security standards, the second database being protected by a network security feature for preventing DNS cache poisoning;
a communication interface configured to receive from the communication terminal the domain name and the IP address of the site; and
a processor configured to:
check whether a combination of the domain name and the IP address is registered in the first database;
if the combination is not registered in the first database, check whether the combination is registered in at least one of the plurality of DNS servers whose identification information is registered in the second database; and
if the combination is registered in the first database or in the at least one DNS server, permit an access by the communication terminal to the site.

14. A communication system comprising a communication terminal and a security management device,
the communication terminal comprising:
a processor configured to obtain a domain name and an IP address of a site; and
a communication interface configured to send the domain name and the IP address to the security management device,
the security management device comprising:
a first database that stores domain names and IP addresses of sites, an access to which is confirmed as not permissible, in association with each other;
a second database that stores identification information of a plurality of DNS servers meeting predetermined security standards, the second database being protected by a network security feature for preventing DNS cache poisoning;
a communication interface configured to receive from the communication terminal the domain name and the IP address of the site; and
a processor configured to:
check whether a combination of the domain name and the IP address is registered in either the first database or the second database;
if the combination is not registered in the first database, check whether the combination is registered in at least one of the plurality of DNS servers whose identification information is registered in the second database; and
if the combination is registered in the first database or if the combination is not registered in the at least one DNS server, inhibit an access by the communication terminal to the site.

15. An access control method comprising:
sending a domain name and an IP address of a site from a communication terminal to a security management device;
receiving the domain name and the IP address at the security management device;
checking at the security management device whether a combination of the domain name and the IP address is registered in either a first database or a second database, wherein the first database stores domain names and IP addresses of sites, an access to which is confirmed as permissible, in association with each other, and the second database stores domain names and IP addresses of sites, an access to which is confirmed as not permissible, in association with each other;
if the combination is not registered in either the first database or the second database, checking at the security management device whether the combination is registered in a third database, wherein the third database stores identification information of a plurality of DNS servers meeting predetermined security standards, the third database being protected by a network security feature for preventing DNS cache poisoning;
if the combination is registered in either the first database or at least one of the plurality of DNS servers whose identification information is registered in the third database, permitting by the security management device an access by the communication terminal to the site; and
if the combination is registered in the second database or if the combination is not registered in the at least one DNS server, inhibiting by the security management device an access by the communication terminal to the site.

16. An access control method comprising:
sending a domain name and an IP address of a site from a communication terminal to a security management device;
receiving the domain name and the IP address at the security management device;
checking at the security management device whether a combination of the domain name and the IP address is registered in a first database, wherein the first database stores domain names and IP addresses of sites, an access to which is confirmed as permissible, in association with each other;
if the combination is not registered in the first database, checking at the security management device whether the combination is registered in a second database, wherein the second database stores identification information of a plurality of DNS servers meeting predetermined security standards, the second database being protected by a network security feature for preventing DNS cache poisoning; and
if the combination is registered in the first database or in at least one of the plurality of DNS servers whose identification information is registered in the second database, permitting by the security management device an access by the communication terminal to the site.

17. An access control method comprising:

sending a domain name and an IP address of a site from a communication terminal to a security management device;

receiving the domain name and the IP address at the security management device;

checking at the security management device whether a combination of the domain name and the IP address is registered in a first database, wherein the first database stores domain names and IP addresses of sites, an access to which is confirmed as not permissible, in association with each other;

if the combination is not registered in the first database, checking at the security management device whether the combination is registered in a second database, wherein the second database stores identification information of a plurality of DNS servers meeting predetermined security standards, the second database being protected by a network security feature for preventing DNS cache poisoning; and if the combination is registered in the first database or if the combination is not registered in at least one of the plurality of DNS servers whose identification information is registered in the second database, inhibiting by the security management device an access by the communication terminal to the site.

18. A security management device comprising:

a first database that stores domain names and IP addresses of sites, an access to which is confirmed as permissible, in association with each other;

a second database that stores combinations of a domain name and an IP address of a bogus site camouflaging an authentic site, and IP addresses of the authentic sites in association with each other;

a third database that stores identification information of a plurality of DNS servers meeting predetermined security standards, the third database being protected by a network security feature for preventing DNS cache poisoning;

a communication interface configured to receive from a communication terminal a domain name and an IP address of a site; and a processor configured to:

check whether a combination of the domain name and the IP address is registered in either the first database or the second database;

if the combination is registered in the first database, permit an access by the communication terminal to the site;

if the combination is registered in the second database, cause the communication terminal to access an authentic site identified by an IP address stored in the second database in association with the combination;

if the combination is not registered in either the first database or the second database, check whether the combination is registered in at least one of the plurality of DNS servers whose identification information is registered in the third database;

if the combination is registered in the at least one DNS server, permit an access by the communication terminal to the site; and if the combination is not registered in the at least one DNS server, inhibit an access by the communication terminal to the site.

19. A communication system comprising a communication terminal and a security management device, the communication terminal comprising:

a processor configured to obtain a domain name and an IP address of a site; and a communication interface configured to send the domain name and the IP address to the security management device, the security management device comprising:

a first database that stores domain names and IP addresses of sites, an access to which is confirmed as permissible, in association with each other;

a second database that stores combinations of a domain name and an IP address of a bogus site camouflaging an authentic site, and IP addresses of the authentic sites in association with each other;

a third database that stores identification information of a plurality of DNS servers meeting predetermined security standards, the third database being protected by a network security feature for preventing DNS cache poisoning;

a communication interface configured to receive from the communication terminal the domain name and the IP address of the site; and a processor configured to:

check whether a combination of the domain name and the IP address is registered in either the first database or the second database;

if the combination is registered in the first database, permit an access by the communication terminal to the site;

if the combination is registered in the second database, cause the communication terminal to access an authentic site identified by an IP address stored in the second database in association with the combination;

if the combination is not registered in either the first database or the second database, check whether the combination is registered in at least one of the plurality of DNS servers whose identification information is registered in the third database;

if the combination is registered in the at least one DNS server, permit an access by the communication terminal to the site; and if the combination is not registered in the at least one DNS server, inhibit an access by the communication terminal to the site.

20. An access control method comprising:

sending a domain name and an IP address of a site from a communication terminal to a security management device;

receiving the domain name and the IP address at the security management device;

checking at the security management device whether a combination of the domain name and the IP address is registered in either a first database or a second database, wherein the first database stores domain names and IP addresses of sites, an access to which is confirmed as permissible, in association with each other, and the second database stores combinations of a domain name and an IP address of a bogus site camouflaging an authentic site, and IP addresses of the authentic sites in association with each other;

if the combination is registered in the first database, permitting by the security management device an access by the communication terminal to the site;

if the combination is registered in the second database, causing by the security management device the communication terminal to access an authentic site identified by an IP address stored in the second database in association with the combination;

if the combination is not registered in either the first database or the second database, checking at the security management device whether the combination is registered in a plurality of DNS servers whose identification information is registered in a third database, wherein the third database stores identification information of at least one of the plurality of DNS servers meeting predetermined security standards, the third database being protected by a network security feature for preventing DNS cache poisoning;

if the combination is registered in the at least one DNS server, permitting by the security management device an access by the communication terminal to the site; and if the combination is not registered in the at least one DNS server, inhibiting by the security management device an access by the communication terminal to the site.

\* \* \* \* \*